(12) United States Patent
Kanamaru et al.

(10) Patent No.: US 6,584,234 B2
(45) Date of Patent: Jun. 24, 2003

(54) APPARATUS FOR AND METHOD OF PROCESSING IMAGE AND INFORMATION RECORDING MEDIUM

(75) Inventors: Shoji Kanamaru, Tokyo (JP); Yoshihiko Kuroki, Kanagawa (JP); Yoshifumi Mori, Chiba (JP); Ryuichi Ugajin, Tokyo (JP); Hitoshi Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 73 days.

(21) Appl. No.: 09/977,722

(22) Filed: Oct. 15, 2001

(65) Prior Publication Data

US 2002/0039455 A1 Apr. 4, 2002

Related U.S. Application Data

(62) Division of application No. 09/189,956, filed on Nov. 12, 1998, now Pat. No. 6,353,689.

(30) Foreign Application Priority Data

Nov. 11, 1997 (JP) .............................. 9-308858
Apr. 16, 1998 (JP) ............................ 10-106638
Aug. 14, 1998 (JP) ............................ 10-229832

(51) Int. Cl.$^7$ ................................. G06K 9/36
(52) U.S. Cl. .................................... 382/280
(58) Field of Search ................ 382/280, 276, 382/249, 250, 248; 708/403; 348/711

(56) References Cited

U.S. PATENT DOCUMENTS

| | | | | |
|---|---|---|---|---|
| 5,046,112 A | * | 9/1991 | Chang et al. | 382/280 |
| 5,084,818 A | * | 1/1992 | Machida | 382/280 |
| 5,915,034 A | * | 6/1999 | Nakajima et al. | 382/280 |
| 5,982,954 A | * | 11/1999 | Delen et al. | 382/280 |
| 6,067,367 A | * | 5/2000 | Nakajima et al. | 382/280 |
| 6,272,350 B1 | * | 8/2001 | Tekinay | 455/506 |

* cited by examiner

*Primary Examiner*—Yon J. Couso
(74) *Attorney, Agent, or Firm*—Sonnenschein, Nath & Rosenthal

(57) ABSTRACT

An image processing apparatus capable of extracting widely viewed features of an entire image and speedily performing image processing, and a method and an information recording medium for such processing. Image data of an original image is obtained by imaging the entire original image with an image pickup unit at a time. An amplitude distribution of a signal is obtained from the image data by fast Fourier transform performed by a fast Fourier transform section of a signal processing unit. An amplitude replacement section replaces the amplitude distribution with a predetermined function using the distance from a center of a frequency plane as a parameter. An inverse fast Fourier transform section forms an image corresponding to the original image by inverse fast Fourier transform from a phase distribution of points obtained by the fast Fourier transform and from an amplitude distribution obtained by the above-described replacement.

24 Claims, 22 Drawing Sheets

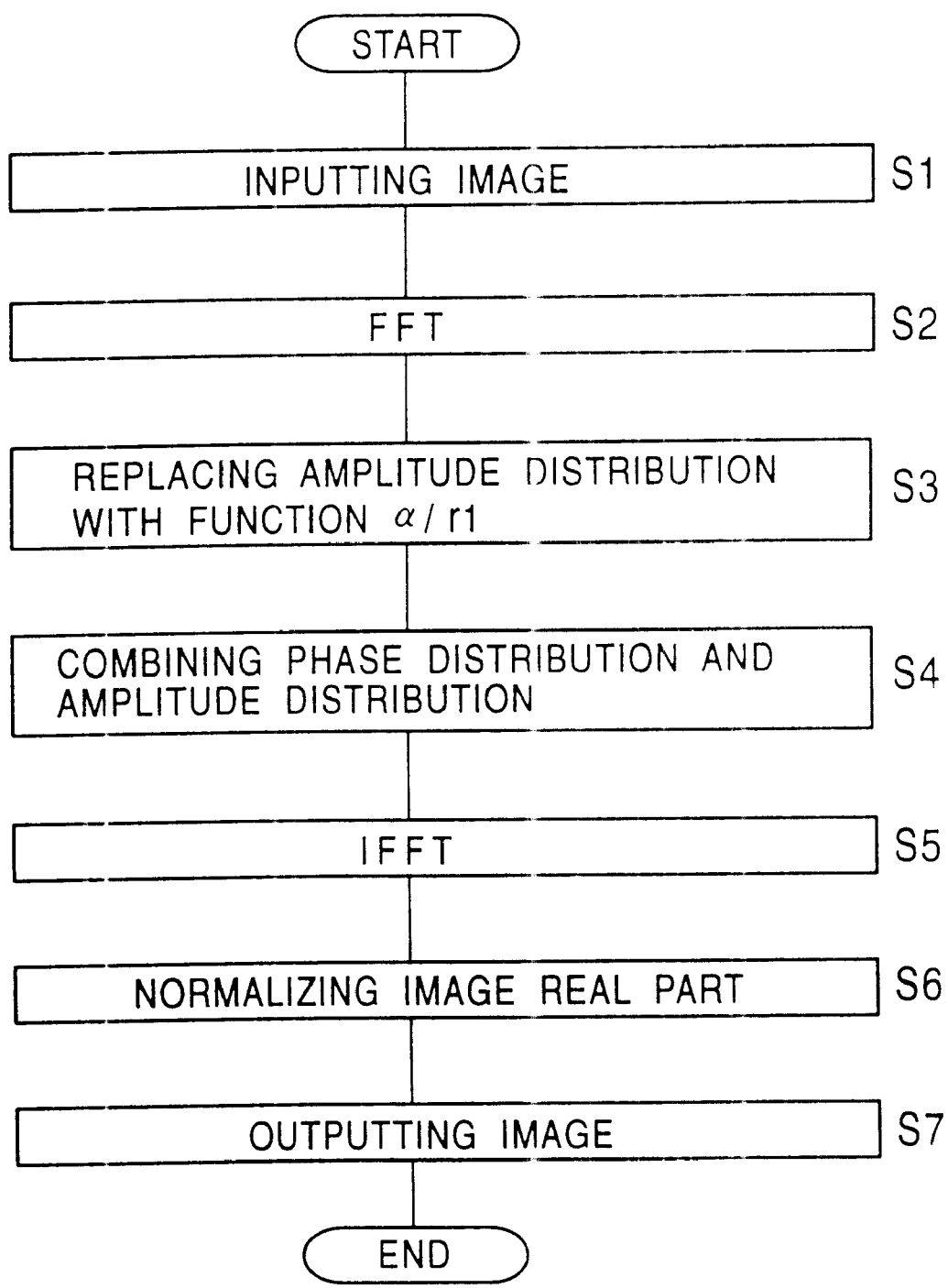

APPARATUS FOR AND METHOD OF PROCESSING IMAGE AND INFORMATION RECORDING MEDIUM

RELATED APPLICATION DATA

This application is a divisional application of U.S. application Ser. No. 09/189,956 now U.S. Pat. No. 6,353,689 issued Mar. 5, 2002. The present application and the parent application claim priority to Japanese application Nos. P09-308858 filed Nov. 11, 1997, P10-106638 filed Apr. 16, 1998, and P10-229832 filed Aug. 14, 1998. All of these applications are incorporated herein by reference to the extent permitted by law.

BACKGROUND OF THE INVENTION

1. Field of the Invention

The present invention relates to an image processing apparatus, an image processing method and an information recording medium for processing an input image by Fourier transform.

2. Description of the Related Art

Conventionally, a method for image compression or the like has ordinarily been used in which an original image is divided into domains and a feature of each domain is extracted by discrete cosine transform of each domain. If an original image to be processed by such a method is input to a processing apparatus by an optical system, the optical system is moved so as to image divided domains of the image one after another.

The method of dividing an original image into domains and performing discrete cosine transform of each domain as described above achieves a high compression ratio but entails occurrence of considerable block-like noise at the time of inverse transform. Also, because of processing with respect to each domain, it is difficult to extract widely viewed features of an entire original image. Further, the conventional method of processing an image by moving an optical system and imaging divided domains of the image one after another is disadvantageous because a considerably long time is required for the troublesome image processing.

SUMMARY OF THE INVENTION

In view of the above-described circumstances, an object of the present invention is to provide an image processing apparatus capable of extracting widely viewed features of an entire image and speedily performing image processing, and a method and an information recording medium for such processing.

According to the present invention, the above-described object is accomplished by performing a process in which an entire original image is input at a time and transformed by Fourier transform; an amplitude distribution of a signal obtained by the Fourier transform is replaced with a predetermined function using the distance from a center of a frequency plane as a parameter; and an image corresponding to the original image is formed by inverse Fourier transform from a phase distribution of points obtained by the Fourier transform and from an amplitude distribution obtained by the above-mentioned replacement.

That is, to perform this process of the present invention, there is provided an information processing apparatus including an image input section for inputting an original image, a transform section for performing Fourier transform of the input image, an amplitude replacement section for replacing an amplitude distribution of a signal obtained by the transform section with a predetermined function approximated to the amplitude distribution and using the distance from a center of a frequency plane as a parameter, and an inverse transform section for forming an image corresponding to the original image by inverse Fourier transform from a phase distribution of points obtained by the transform section and from an amplitude distribution obtained by the replacement performed by the amplitude replacement section.

According to the present invention, there is also provided an image processing method including an image input step of inputting an original image, a transform step of performing Fourier transform of the input image, an amplitude replacement step of replacing an amplitude distribution of a signal obtained by the Fourier transform with a predetermined function approximated to the amplitude distribution and using the distance from a center of a frequency plane as a parameter, and an inverse transform step of forming an image corresponding to the original image by inverse Fourier transform from a phase distribution of points obtained by the Fourier transform and from an amplitude distribution obtained by the replacement in the amplitude replacement step.

According to the present invention, there is also provide an information recording medium having an image processing program stored therein, the image processing program being readable and executable by a computer which performs a process including an image input step of inputting an original image, a transform step of performing Fourier transform of the input image, an amplitude replacement step of replacing an amplitude distribution of a signal obtained by the Fourier transform with a predetermined function approximated to the amplitude distribution and using the distance from a center of a frequency plane as a parameter, and an inverse transform step of forming an image corresponding to the original image by inverse Fourier transform from a phase distribution of points obtained in the transform step and from an amplitude distribution obtained by the replacement in the amplitude replacement step.

According to the present invention, the above-mentioned predetermined function is, for example, a fractional function using the distance from the center of the frequency plane as a parameter. According to the present invention, the values of the real parts of points of the image formed by the inverse Fourier transform are changed so that the real part of each point is not smaller than 0. Further, a trial function:

$$f(k)=a/(k^b+h)$$

is used as an optimal approximation to the second power of an amplitude distribution of each of the points on the Fourier complex plane.

According to the present invention, the above-described object is also accomplished by performing a process in which an original image is input and transformed by Fourier transform; a fractal dimension of an amplitude distribution with respect to the distance from the center of a Fourier complex plane of a signal obtained by the Fourier transform is calculated; an amplitude distribution of points on the Fourier replaced is replaced with a predetermined function using the fractal dimension; and an image corresponding to the original image is formed by inverse Fourier transform from a phase distribution of the points obtained by the Fourier transform and from an amplitude distribution obtained by the above-mentioned replacement.

According to the present invention, to perform this process, there is provided an image processing apparatus including an image input section for inputting an original image, a transform section for performing Fourier transform of the input image, a fractal dimension calculation section for calculating a fractal dimension of an amplitude distribution with respect to the distance from a center point of a Fourier complex plane obtained by the transform section, an amplitude replacement section for replacing an amplitude distribution of points on the Fourier complex plane obtained by the transform section with a predetermined function using the fractal dimension calculated by the fractal dimension calculation section, and an inverse transform section for forming an image by inverse Fourier transform from a phase distribution of the points on the Fourier complex plane obtained by the transform section and from an amplitude distribution obtained by the replacement performed by the amplitude replacement section.

According to the present invention, there is also provided an image processing method including an image input step of inputting an original image, a transform step of performing Fourier transform of the input image, a fractal dimension calculation step of calculating a fractal dimension of an amplitude distribution with respect to the distance from a center point of a Fourier complex plane obtained by the Fourier transform, an amplitude replacement step of replacing an amplitude distribution of points on the Fourier complex plane obtained by the Fourier transform with a predetermined function using the fractal dimension, and an inverse transform step of forming an image by inverse Fourier transform from a phase distribution of the points on the Fourier complex plane obtained by the Fourier transform and from an amplitude distribution obtained by the replacement in the amplitude replacement step.

According to the present invention, there is also provided an information recording medium having an image processing program stored therein, the image processing program being readable and executable by a computer which performs a process including an image input step of inputting an original image, a transform step of performing Fourier transform of the input image, a fractal dimension calculation step of calculating a fractal dimension of an amplitude distribution with respect to the distance from a center point of a Fourier complex plane obtained by the Fourier transform, a replacement step of replacing an amplitude distribution of points on the Fourier complex plane obtained by the Fourier transform with a predetermined function using the fractal dimension, and an inverse transform step of forming an image by inverse Fourier transform from a phase distribution of the points on the Fourier complex plane obtained by the Fourier transform and from an amplitude distribution obtained by the replacement in the amplitude replacement step.

According to the present invention, the amplitude distribution is replaced with, for example, a function shown as $\alpha/f^d$ where f is the spatial frequency of the input image corresponding to the distance from the center point of the Fourier complex plane, d is the fractal dimension, and $\alpha$ is a predetermined constant. According to the present invention, the values of the real parts of points of the image formed by the inverse Fourier transform are changed so that the minimum of the real parts of the points is not smaller than 0.

Further, according to the present invention, the above-described object is accomplished by performing a process in which an original image is input and transformed by Fourier transform; an amplitude distribution of points on a Fourier complex plane obtained by the Fourier transform is replaced with a predetermined function; equivalent smoothing transform of a phase distribution of the points on the Fourier complex plane obtained by the Fourier transform is performed in one of a direction along the abscissa and a direction along the coordinate; differences in the phase distribution processed by the equivalent smoothing transform are extracted along the direction of the smoothing transform; secondary differences in a phase distribution obtained by the first difference extraction are further extracted; an amplitude distribution obtained by the replacement with the predetermined function and the secondary differences in the phase distribution are combined with each other; the amplitude distribution is replaced with the result of the above-mentioned combining; and an image corresponding to the original image is formed by inverse Fourier transform from the phase distribution of the points on the Fourier complex plane obtained by the Fourier transform and from the amplitude distribution obtained by the above-mentioned combining.

To perform this process according to the present invention, there is provided an image processing apparatus including an image input section for inputting an original image, a transform section for performing Fourier transform of the input image, an amplitude replacement section for replacing an amplitude distribution of points on a Fourier complex plane obtained by the transform section with a predetermined function, a smoothing transform section for performing equivalent smoothing transform of a phase distribution of the points on the Fourier complex plane obtained by the transform section in one of a direction along the abscissa and a direction along the coordinate, a difference detection section for extracting differences in the phase distribution of the points on the Fourier complex plane processed by the equivalent smoothing transform performed by the smoothing transform section, the differences being extracted along the direction of the smoothing transform, a secondary difference detection section for further extracting differences in a phase distribution obtained by extracting differences by the difference detection section, a combining section for combining an amplitude distribution obtained by the replacement performed by the amplitude replacement section, and the secondary differences in the phase distribution detected by the secondary difference detection section, the combining means replacing the amplitude distribution with the result of the above-mentioned combining, and an inverse transform section for forming an image corresponding to the original image by inverse Fourier transform from the phase distribution of the points on the Fourier complex plane obtained by the transform section and from the amplitude distribution obtained by the combining performed by the combining means.

According to the present invention, there is also provided an image processing method including an image input step of inputting an original image, a transform step of performing Fourier transform of the input image, an amplitude replacement step of replacing an amplitude distribution of points on a Fourier complex plane obtained by the Fourier transform with a predetermined function, a smoothing transform step of performing equivalent smoothing transform of a phase distribution of the points on the Fourier complex plane obtained by the Fourier transform in one of a direction along the abscissa and a direction along the coordinate, a difference detection step of extracting differences in the phase distribution processed by the equivalent smoothing transform, the differences being extracted along the direction of the smoothing transform, a secondary difference detection step of further extracting differences in a phase distribution obtained by extracting differences in said difference detection step, a combining step of combining an amplitude distribution obtained by the replacement with the predetermined function, and the secondary differences in the phase distribution, and replacing the amplitude distribution with the result of the above-mentioned combining, and an inverse transform step of forming an image corresponding to the original image by inverse Fourier transform from the phase distribution of the points on the Fourier complex plane obtained by the Fourier transform and from the amplitude distribution obtained by the above-mentioned combining.

According to the present invention, there is also provided an information recording medium having an image processing program stored therein, the image processing program being readable and executable by a computer which performs a process including an image input step of inputting an entire original image at a time, a transform step of performing Fourier transform of the input image, an amplitude replacement step of replacing an amplitude distribution of points on a Fourier complex plane obtained by the Fourier transform with a predetermined function, a smoothing transform step of performing equivalent smoothing transform of a phase distribution of the points on the Fourier complex plane obtained by the Fourier transform in one of a direction along the abscissa and a direction along the coordinate, a difference detection step of extracting differences in the phase distribution processed by the equivalent smoothing transform, the differences being extracted along the direction of the smoothing transform, a secondary difference detection step of further extracting differences in a phase distribution obtained by extracting differences in the difference detection step, a combining step of combining an amplitude distribution obtained by the replacement with the predetermined function, and the secondary differences in the phase distribution, and replacing the amplitude distribution with the result of the combining, and an inverse transform step of forming an image corresponding to the original image by inverse Fourier transform from the phase distribution of the points on the Fourier complex plane obtained by the Fourier transform and from the amplitude distribution obtained by the combining.

According to the present invention, the above-mentioned predetermined function is, for example, a 1/f function using as a parameter a spatial frequency f of the input image corresponding to the distance from the point of the Fourier complex plane. The above described "difference(s)" can be substituted by "differential(s)". According to the present invention, in the smoothing transform, $2n\pi$ (n: integer) is added to each of the points starting from a phase value on one of the coordinate and the abscissa of the Fourier complex plane such that the amount of change between the phase values of each pair of the points adjacent to each other in one of a direction along the coordinate and a direction along the abscissa is within the range of $\pm\pi$. Further, the Fourier transform and/or inverse Fourier transform are performed by using a fast Fourier transform algorithm.

BRIEF DESCRIPTION OF THE DRAWINGS

FIG. 6 is a flowchart of the process of processing an image with the image processing apparatus.

DESCRIPTION OF THE PREFERRED EMBODIMENTS

Embodiments of the present invention will be described below in detail with reference to accompanying drawings.

Figure 1:
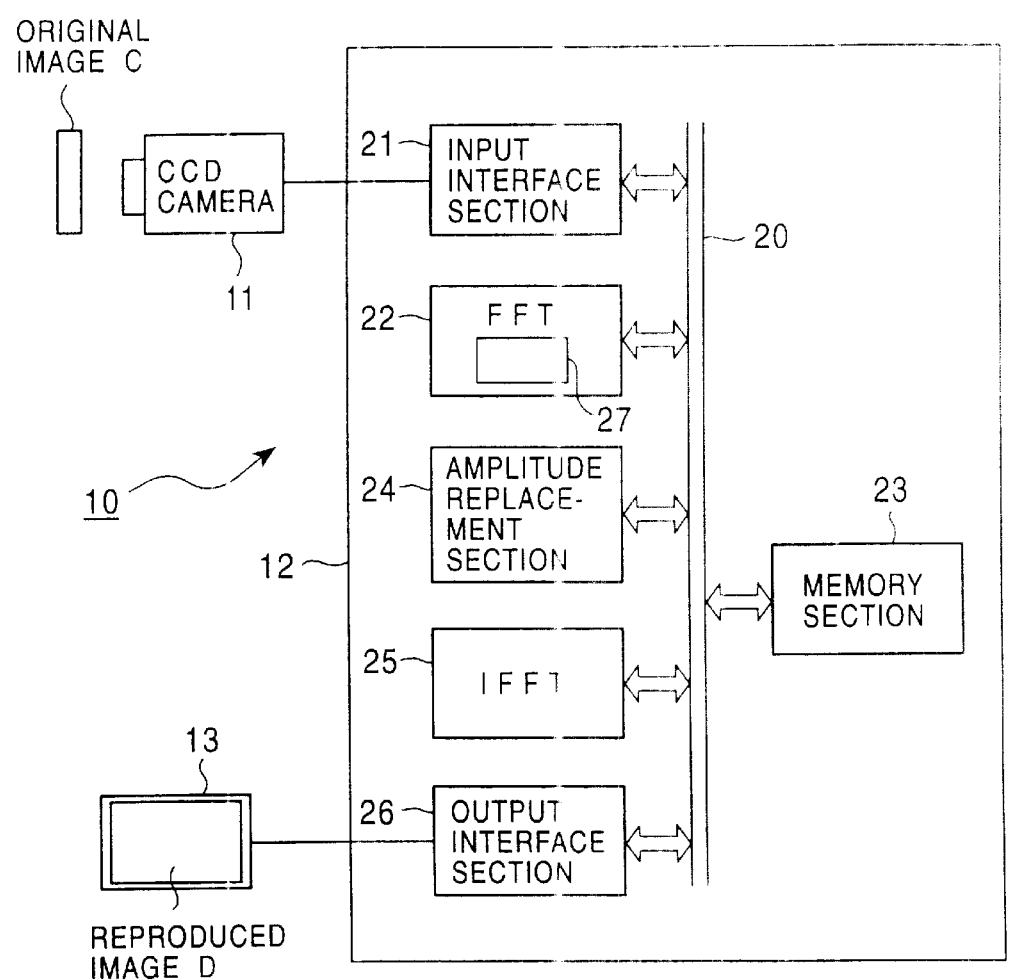
FIG. 1 is a block diagram showing the configuration of an image processing apparatus which represents an embodiment of the present invention.

FIG. 1 shows an image processing apparatus 10 which represents an embodiment of the present invention.

The image processing apparatus 10 shown in FIG. 1 has an image pickup unit 11 which images an original image C, a signal processing unit 12 which is supplied with data of original image C from the image pickup unit 11, and a display unit 13 which is supplied with image data from the signal processing unit 12.

The image pickup unit 11 is formed of, for example, a charge-coupled device (CCD) camera. The image pickup unit 11 is arranged to image the entire original image C at a time and to supply image data representing the original image C to the signal processing unit 12.

The signal processing unit 12 is formed of a microcomputer with functional components including an input interface section 21, a fast Fourier transform (FFT) section 22, a memory section 23, an amplitude replacement section 24, an inverse fast Fourier transform (IFFT) section 25, and an output interface section 26. These sections are connected to a bus 20.

The input interface section 21 of this signal processing unit 12 supplies, via the buss 20, the FFT section 22 with image data of original image C obtained by the image pickup unit 11. The input interface section 21 and the image pickup unit 11 constitute image input means.

The FFT section 22 is arranged to perform fast Fourier transform of image data of original image C supplied from the input interface section 21.

More specifically, the FFT section 22 executes calculation processing corresponding to equation (1) shown below, thereby forming transformed complex number data F (ωx, ωy) formed of a real part A (ωx, ωy) and an imaginary part B (ωx, ωy).

$$F(\omega x, \omega y) = \frac{1}{2\pi}\int\int f(x, y)e^{-ix\omega x}e^{-iy\omega y}d\omega x d\omega y \qquad (1)$$
$$= A(\omega x, \omega y) + iB(\omega x, \omega y)$$

In equation (1), i represents the imaginary unit and ωx and ωy represent x and y frequency components.

The FFT section 22 has a polar coordinate conversion section 27 for performing polar coordinate conversion such that transformed data F (ωx, ωy) obtained by the calculation shown above by equation (1) is expressed in polar coordinates as shown by the following equation (2):

$$F(\omega x, \omega y) + R(\omega y \ \omega y)e^{i\theta(\omega x, \ \omega y)} \qquad (2)$$

In equation (2), R (ωx, ωy) represents the amplitude of F (ωx, ωy) and θ represents the phase of F (ωx, ωy).

The FFT section 22 outputs via the bus 20 the amplitude R (ωx, ωy) and the phase θ (ωx, ωy) obtained by the polar coordinate conversion section 27. The amplitude R (ωx, ωy) output by the polar coordinate conversion section 27 via the bus 20 is supplied to the amplitude replacement section 24 while the phase θ (ωx, ωy) is supplied to the memory section 23.

The amplitude replacement section 24 in the above-described signal processing unit 12 replaces the amplitude R (ωx, ωy) from the polar coordinate conversion section 27 with a predetermined function.

Replacement processing in the amplitude replacement section 24 will now be described in detail.

Figure 2:
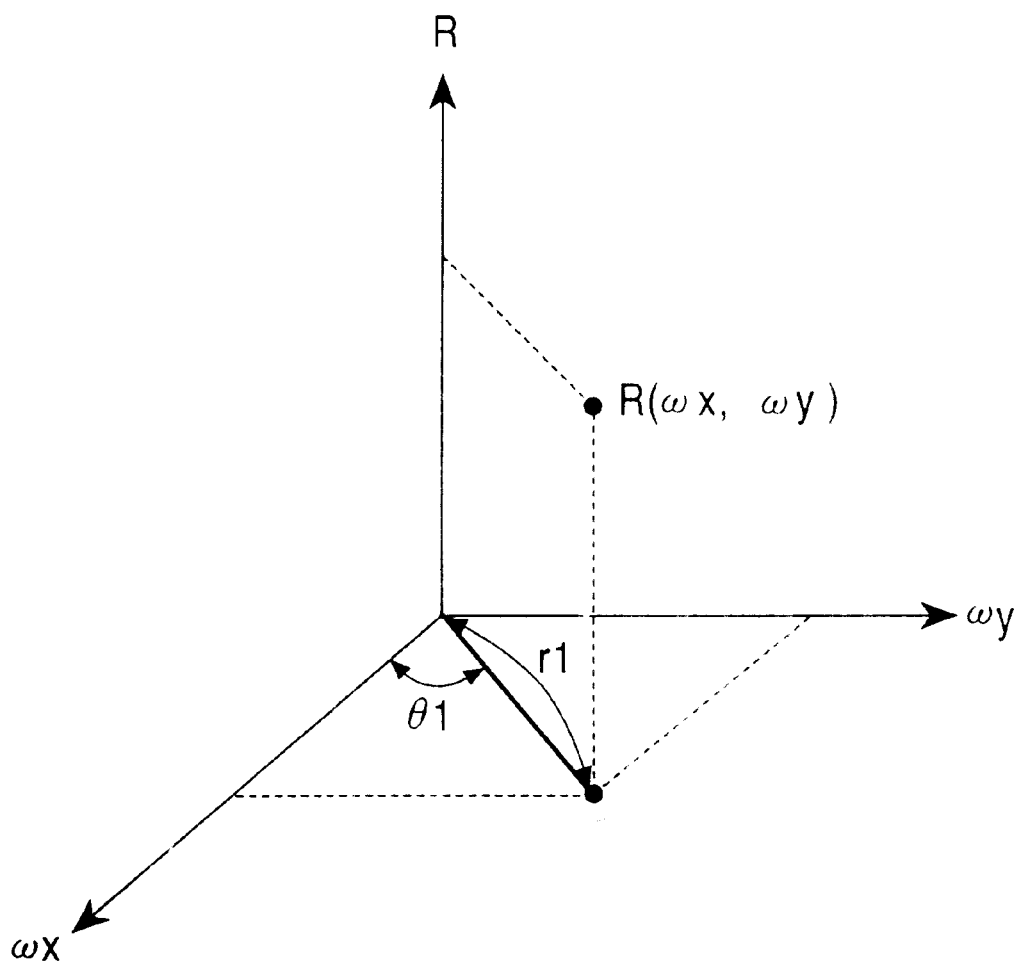
FIG. 2 is an amplitude-frequency spatial coordinate diagram.

FIG. 2 is a diagram of a spatial coordinate system constituted of the amplitude R (ωx, ωy) and frequencies ωx and ωy.

As shown in FIG. 2, the amplitude of each of dots is indicated at a point P of the frequencies ωx and ωy in the X-Y coordinate system.

Expression of the amplitude R (ωx, ωy) with the frequencies ωx and ωy in the X-Y coordinate system is not preferred in extracting features of an image. That is, an image has not only components parallel to the X- and Y-axes but also components in oblique directions, and a feature corresponding to such a component cannot be extracted as long as the above-mentioned expression is used.

In the amplitude replacement section 24, the amplitude R (ωx, ωy) is converted into an amplitude R(r1) in r1-θ1 polar coordinates. The radial coordinate r1 represents the distance from the center of the frequency ωx-ωy plane is used as a parameter of the amplitude.

Figure 3A:
FIGS. 3A and 3B are diagrams showing examples of original images processed by the image processing apparatus shown in FIG. 1.
Figure 3B:
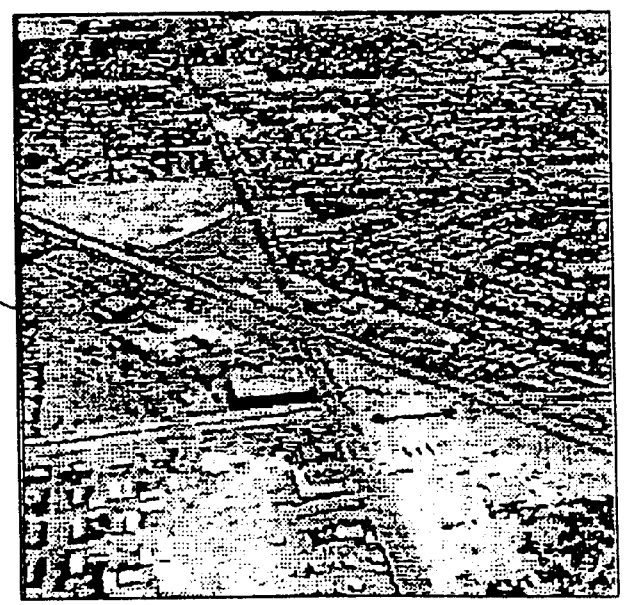
Figure 4:
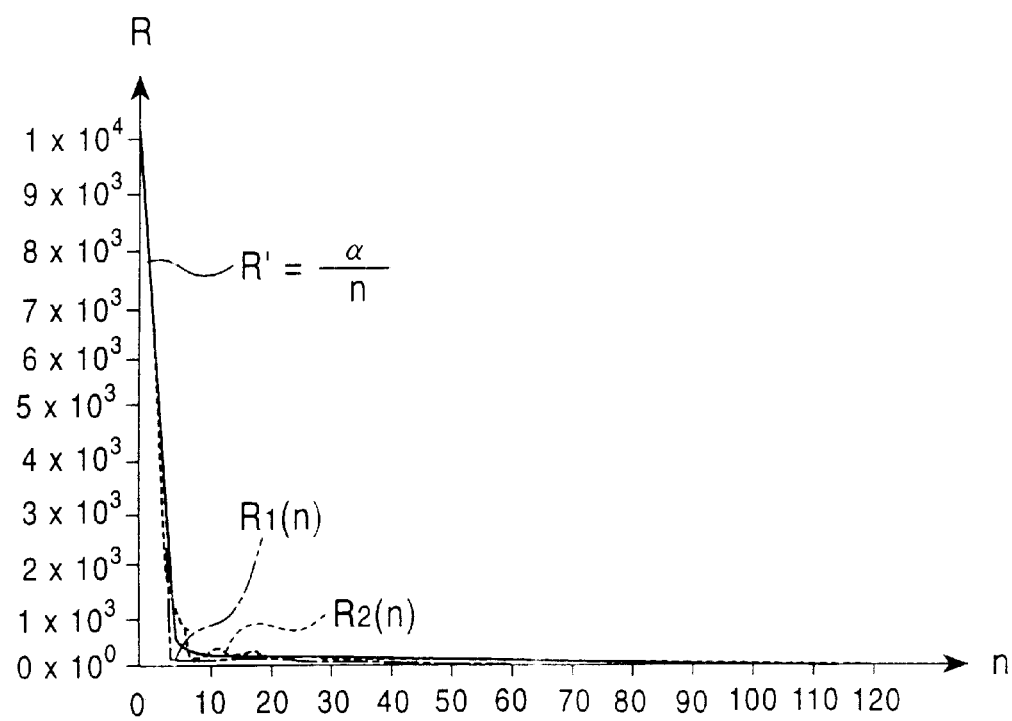
FIG. 4 is a diagram showing a frequency component amplitude distribution obtained by fast Fourier transform of the original images shown in FIGS. 3A and 3B.

For example, if original images C1 and C2 such as those shown in FIGS. 3A and 3B are expressed by such amplitude R(r1), the amplitude R1(r1) of the original image C1 has a distribution such as indicated by the dot-dash line in FIG. 4, and the amplitude R2(r1) of the original image C2 has a distribution such as indicated by the broken line in FIG. 4.

The amplitude replacement section 24 replaces each of the amplitudes R1(r1) and R2(r1) with a function α/r1 (α: an arbitrary constant) which is an approximation to the amplitude.

That is, the amplitude replacement section 24 replaces the amplitude R (ωx, ωy) from the polar coordinate conversion section 27 with the function α/r1 as shown by equation (3).

$$R(f^d) = \frac{\alpha}{r1} \qquad (3)$$
$$R(\omega x, \omega y) = \frac{\alpha}{\sqrt{\omega x^2 + \omega y^2}}$$

In the amplitude replacement section 24, transformed data $F_1$ (ωx, ωy) shown by equation (4) below is formed based on the equation (2) shown above and by using the substitute amplitude R (ωx, ωy) shown by equation (3) and the phase θ (ωx, ωy) read out from the memory section 23.

$$F_1(\omega x, \omega y) = \frac{\alpha}{\sqrt{\omega x^2 + \omega y^2}} e^{i\theta(\omega x, \omega y)} \qquad (4)$$

Further, in the amplitude replacement section 24, the real part $A_1$ (ωx, ωy) and the imaginary part $B_1$ (ωx, ωy) of each point are calculated to convert the transformed data $F_1$ (ωx, ωy) shown by equation (4) into a complex number as shown by equation (5) below.

$$F_1(\omega x, \omega y) = A_1(\omega x, \omega y) + i B_1(\omega x, \omega y) \qquad (5)$$

The IFFT section 25 in the signal processing unit 12 performs inverse fast Fourier transform of the transformed data $F_1$ (ωx, ωy) obtained from the above-described amplitude replacement section 24. The IFFT section 25 performs inverse fast Fourier transform of the transformed data $F_1(\omega x, \omega y)$ shown by equation (5) to from image data $f_1(\omega x, \omega y)$ of each point shown by equation (6) below.

$$F_1(\omega x, \omega y) = \frac{1}{2\pi} \int \int f_1(x, y) e^{-ix\omega^x} e^{-iy\omega^y} d\omega x d\omega y \qquad (6)$$
$$= A_2(\omega x, \omega y) + iB_2(\omega x, \omega y)$$

In equation (6), $A_2(x, y)$ is the real part of the image data $f_1(\omega x, \omega y)$ and $B_2(x, y)$ is the imaginary part of the image data $f_1(\omega x, \omega y)$.

From such inverse Fourier transform, occurrence of some points having negative real part $A_2(x, y)$ results. Therefore, the IFFT section 25 performs normalization such as to change each of the negative real parts of the points to a number larger than 0.

Figure 5:
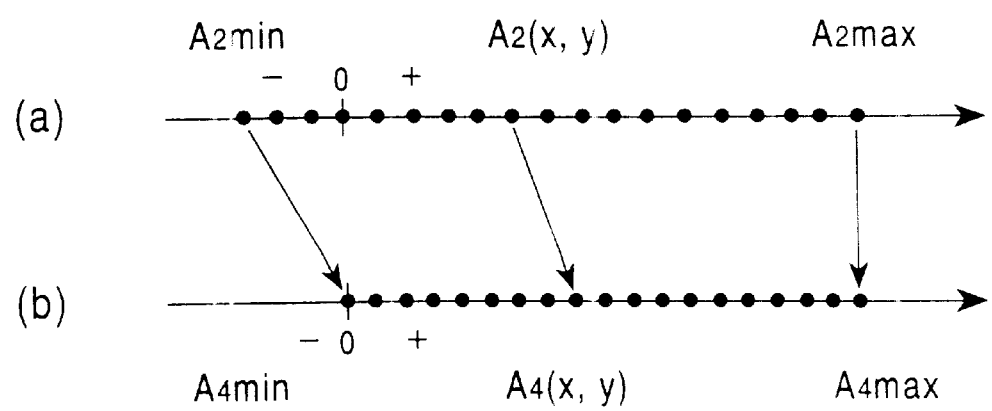
FIG. 5 is a diagram showing normalization processing in the image processing apparatus.

FIG. 5 shows the normalization function of the IFFT section 25. That is, as shown in (a) of FIG. 5, some of the real parts $A_2(x, y)$ between a minimum value $A_2\text{min}$ and a maximum value $A_2\text{max}$ are negative values smaller than 0. The IFFT section 25 calculates the maximum value $A_2\text{max}$ and minimum value $A_2\text{min}$ of the real parts $A_2(x, y)$ of the points forming the output image obtained by inverse Fourier transform, and performs calculation by the following equation (7) with respect to each pixel:

$$A_3(x, y) = \frac{A_2\text{max}(A_2(x, y) - A_2\text{min})}{A_2\text{max} - A_2\text{min}} \qquad (7)$$

In equation (7), $A_2(x, y)$ is each pixel value before conversion and $A_3(x, y)$ is a corresponding pixel value after conversion.

A normalized real part $A_4(x, y)$ is then obtained by calculation of the following equation (8):

$$A_4(x, y) = A_3(x, y) \frac{\beta}{A_2\text{max}} \qquad (8)$$

In equation (8), $\beta$ is a constant corresponding to the number of gradational steps.

That is, in the above-described IFFT section 25, the real parts $A_2(x, y)$ obtained as a result of FFT and including negative values are normalized to real parts $A_4(x, y)$ such that all the pixel values are not smaller than 0 regardless of the constant a in the function $\alpha/r1$, as shown in (b) of FIG. 5, and the real part $A_2(x, y)$ in equation (6) is replaced with the real part $A_4(x, y)$ in equation (8). Consequently, image data $f_1(x, y)'$ expressed as real numbers as shown below by equation (9) is output from the output interface section 26 via the bus 20.

In this image processing apparatus, the display unit 13 is formed of a CRT display or the like and displays reproduced image D corresponding to image data $f_1(x, y)'$ output from the output interface section 26 of the signal processing unit 12.

The operation of the thus-arranged image processing apparatus 10 will be described with reference to the flowchart of FIG. 6. The image processing method of the present invention is practiced with this image processing apparatus 10.

The first step S1 shown in the flowchart of FIG. 6 is an image input step of inputting original image C to be processed. In step S1, an original image, e.g., original image C1 shown in FIG. 3A is imaged by the image pickup unit 11 to form image data f (x, y) of original image C1 to be processed. This image data f (x, y) is input to the FFT section 22 via the input interface section 21.

Step S2 is a step of performing Fourier transform of the input image. In step S2, processing for the calculation shown by equation (1) is executed in the FFT section 22 to perform two-dimensional fast Fourier transform (FFT), and coordinate conversion is performed by executing processing for the calculation shown by equation (2) in the polar coordinate conversion section 27, thereby obtaining the amplitude R ($\omega x, \omega y$) and phase $\theta$ ($\omega x, \omega y$). The amplitude R ($\omega x, \omega y$) is supplied to the amplitude replacement section 24 while the phase $\theta$ ($\omega x, \omega y$) is stored in the memory section 23.

Steps S3 and S4 are amplitude replacement steps. In step S3, the signal amplitude R ($\omega x, \omega y$) obtained by the above-described Fourier transform is converted into r1-$\theta$1 polar coordinates in the amplitude replacement section 24 to be expressed as amplitude R(r1) with the radial coordinate r1 representing the distance from the center of the frequency $\omega x$-$\omega y$ plane used as a parameter of the amplitude. This amplitude distribution R(r1) is replaced with the function $\alpha/r1$ which is an approximation to it.

For example, the amplitude R1 ($\omega x, \omega y$) of the original image C1 shown in FIG. 3A is replaced with the amplitude distribution R1(r1) indicated by dot-dash line in FIG. 4, and this amplitude distribution R1(r1) is replaced with the function $\alpha/r1$ which is an application to it.

That is, the function $\alpha/r1$ with which features of the original image C1 can be extracted in an widely-viewing manner is determined as an amplitude distribution of the original image C1.

In step S4, the amplitude distribution R ($\omega x, \omega y$) thus substituted and shown by equation (3) and the phase $\theta$ ($\omega x, \omega y$) read out from the memory section 23 are combined to form transformed data amplitude $F_1$ ($\omega x, \omega y$) shown by equation (4). Further, the real part $A_1$ ($\omega x, \omega y$) and the imaginary part $B_1$ ($\omega x, \omega y$) of each point are calculated to convert the transformed data $F_1$ ($\omega x, \omega y$) shown by equation (4) to a complex number as shown by equation (5).

Steps S5 and S6 are inverse transform steps of performing inverse Fourier transform. In step S5, inverse fast Fourier transform of the transformed data $F_1$ ($\omega x, \omega y$) shown by equation (5) is performed in the IFFT section to form image data $f_1$ (x, y) of each point shown by equation (6).

In step S6, the image data $f_1$ (x, y) of each point shown by equation (6) is normalized as shown by equations (7) and (8).

In step S7, image data $f_1$ (x, y)' in terms of expressed as real numbers as shown by equation (9) is output from the output interface section 26 to the display unit 13.

$$f_1(x, y)' = A_4(x, y) \qquad (9)$$

In this image processing apparatus 10, reproduced image D is thereby displayed on the screen of the display unit 13 based on the image data $f_1$ (x, y)' output from the output interface section 26 of the signal processing unit 12.

The original image C1 shown in FIG. 3A was processed by this image processing apparatus 10. As a result of the processing, a reproduced image such as image D1 shown in FIG. 7A was displayed on the screen of the display unit 13.

Figure 7A:
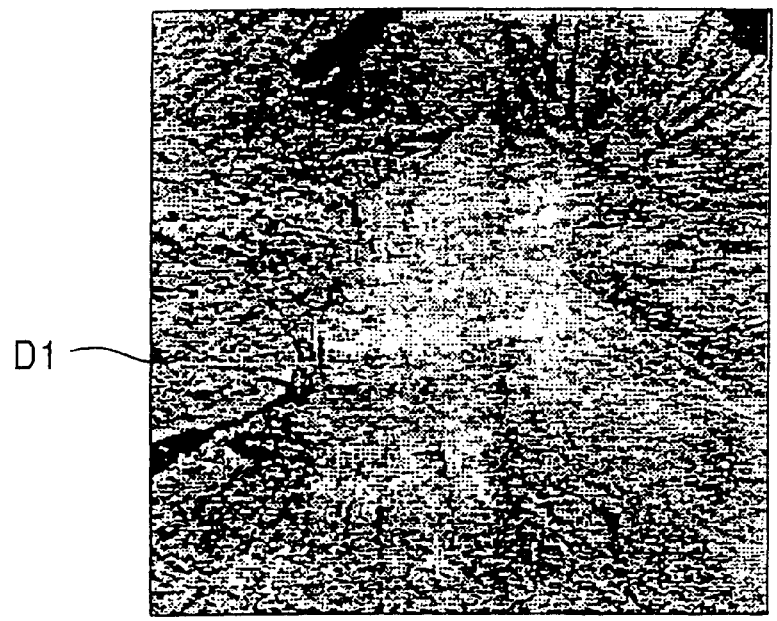
FIGS. 7A and 7B are diagrams showing images obtained by processing the original images shown in FIG. 3.

As is apparent from the comparison between FIGS. 3A and 7A, the reproduced image D1 was formed as an accurate image substantially the same as the original image C1 by recognizing features of the original image 1 in a widely-viewing manner.

Figure 7B:
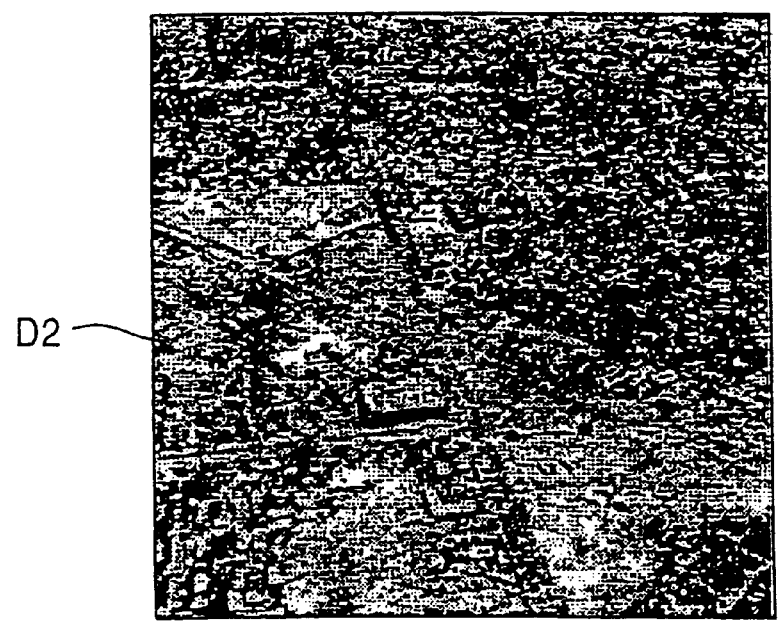

The original image C2 shown in FIG. 3B was also processed in the same manner as the original image C1 by this image processing apparatus 10. As a result of the processing, an accurate reproduced D2 substantially the same as the original image C2 was obtained on the screen of the display unit 13, as shown in FIG. 7B.

As described above, in the image processing apparatus 10, the entire original image C is imaged and input at a time by the image pickup until 11, the entire amplitude distribution R ($\omega$x, $\omega$y) of transformed data F ($\omega$x, $\omega$y) obtained by performing fast Fourier transform of the input image in the FFT section 22 is replaced with the function $\alpha/r1$, and inverse transform of the transformed data is performed in the IFFT section 22 to obtain reproduced image D. Thus, features of the entire original image C can be extracted in a widely-viewing manner.

Since the entire original image C is read, the processing result is free from occurrence of block-like noise at the time of inverse transform and the image processing can be performed. Also, since the entire original image C is input at a time, the image pickup operation and image processing can be easily performed in a short time.

The present invention is not limited to the above-described embodiment. Various changes and modifications of the invention can be made within the scope of the invention.

Figure 8:
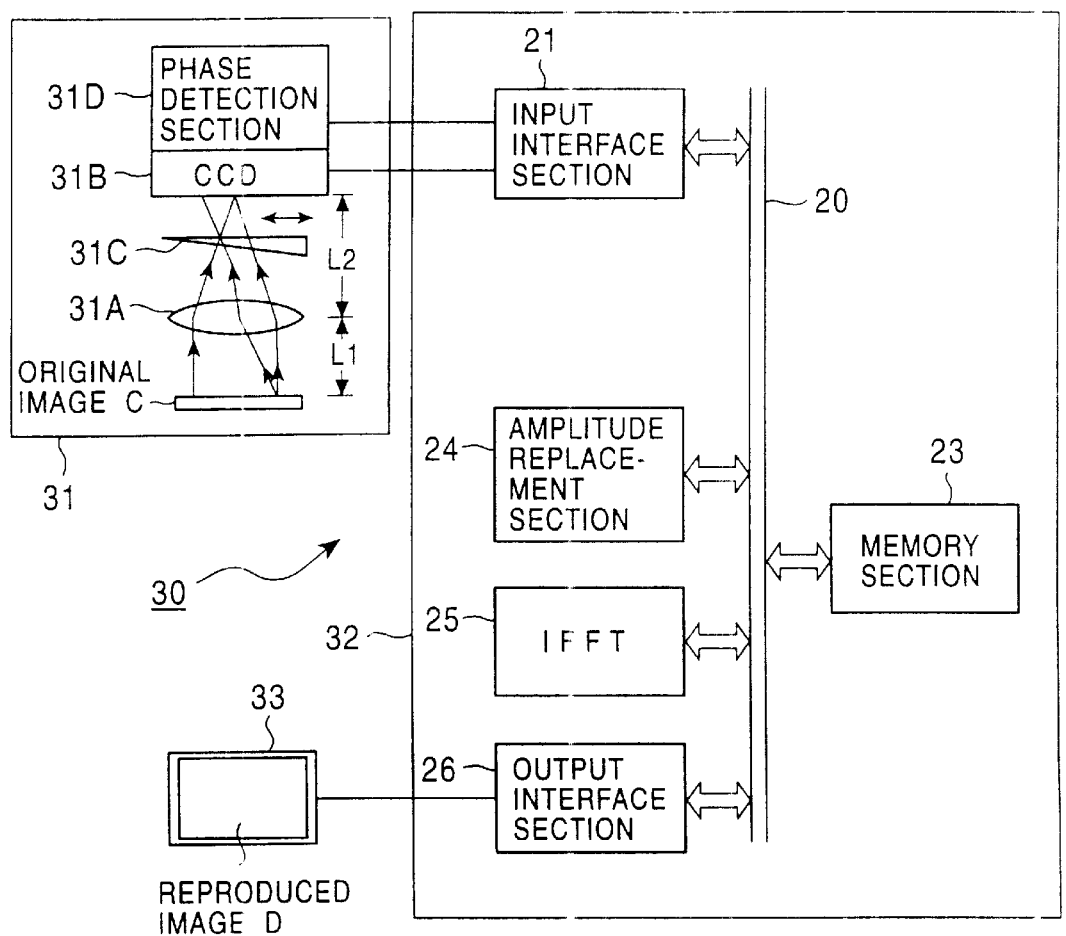
FIG. 8 is a block diagram showing a modification of the image processing apparatus of the present invention.

For example, while the above-described image processing apparatus 10 is arranged to perform fast Fourier transform in the FFT section 22 in the signal processing unit 12, an image processing apparatus 30 arranged as shown in FIG. 8 may be used in which fast Fourier transform of original image C is optically performed in an image pickup unit 31 which images the original image C.

That is, the image processing apparatus 30 has the image pickup unit 31 which images original image C, a signal processing unit 32 to which image data of original image C is input from the image pickup unit 31, and a display unit 33 which is supplied with image data from the signal processing unit 32.

The image pickup unit 31 has a CCD camera in which original image C is imaged by a CCD imager 31 through an optical lens 31A. These components are positioned so that each of the distance L1 between original image C and optical lens 31A and the distance L2 between optical lens 31A and CCD imager 31B is equal to the focal length of optical lens 31A. In the thus-arranged image pickup unit 31, an image pickup output which represents a two-dimensional FFT image amplitude distribution of original image C can be obtained by CCD imager 31B. A phase distribution of original image C can be detected by, for example, a method in which a wedge-shaped glass plate 31C which changes in thickness at a constant rate along one direction is moved along this direction between optical lens 31A and CCD imager 31B, and a phase detection section 31D detects the phase distribution from changes in interference fringes.

This image pickup unit 31 supplies the amplitude distribution R ($\omega$x, $\omega$y) and the phase distribution R$\theta$ ($\omega$x, $\omega$y) and the phase distribution $\theta$ ($\omega$x, $\omega$y) of the two-dimensional FFT image of original image C to the signal processing unit 32 as original image C pickup outputs.

In the signal processing unit 32 of the image processing apparatus 30, when the image pickup outputs representing the amplitude distribution R ($\omega$x, $\omega$y) and the phase distribution $\theta$ ($\omega$x, $\omega$y) of the two-dimensional FFT image of original image C are supplied from the image pickup unit 31, a process which is basically the same as the process shown in the flowchart of FIG. 6 is performed. That is, since fast Fourier transform has already been performed by the optical means, there is no need for the step corresponding to step S2 shown in the flowchart of FIG. 2, i.e., the step of performing two-dimensional fast Fourier transform of the input image. The same steps as step S3 and other subsequent steps in the flowchart of FIG. 2 are thereafter performed.

Therefore, processing in the signal processing unit 32 can be performed without calculation for fast Fourier transform, so that the image processing speed can be increased. Since it is not necessary for the signal processing unit 32 to perform fast Fourier transform, the necessary functional components of the signal processing unit 32 are an input interface section 21, a memory section 23, an amplitude replacement section 24, an inverse fast Fourier transform (FFT) section 25 and an output interface 26.

Inverse fast Fourier transform may also be performed by optical means. In such a case, the load on the signal processing unit 32 can be further reduced to increase the image processing speed.

In the above-described image processing apparatuses 10 and 30, the amplitude distribution is replaced with the function $\alpha/r1$. The substitute function, however, may be any fractional function using the distance f from the center of the frequency plane formed of $\omega$x and $\omega$y, and the following fractional functions are also applicable:

$$\frac{\alpha}{f^2}, \frac{\alpha}{f^3}, \ldots, \frac{\alpha}{f^n}$$

$$\frac{\alpha}{\sqrt{f^3}}, \frac{\alpha}{\sqrt{f^5}}, \ldots, \frac{\alpha}{\sqrt{f^{2n-1}}}$$

Further, in the replacement processing section 24 of the above-described image processing apparatus 10 or 30, optimal approximation of a trial function:

$$f(k) = a/(k^b + h)$$

to the second power of an amplitude distribution of each of points on the Fourier complex plane obtained by Fourier transform may be performed.

That is, an amplitude distribution numerical experiment was made with points on the Fourier complex plane obtained by Fourier transform of an image input, and it was found that the second power of an amplitude distribution of each of the points on the Fourier complex plane obtained by Fourier transform could be comparatively well approximated by a trial function:

$$f(|k|) = a/(|k|^b + h).$$

Figure 9:
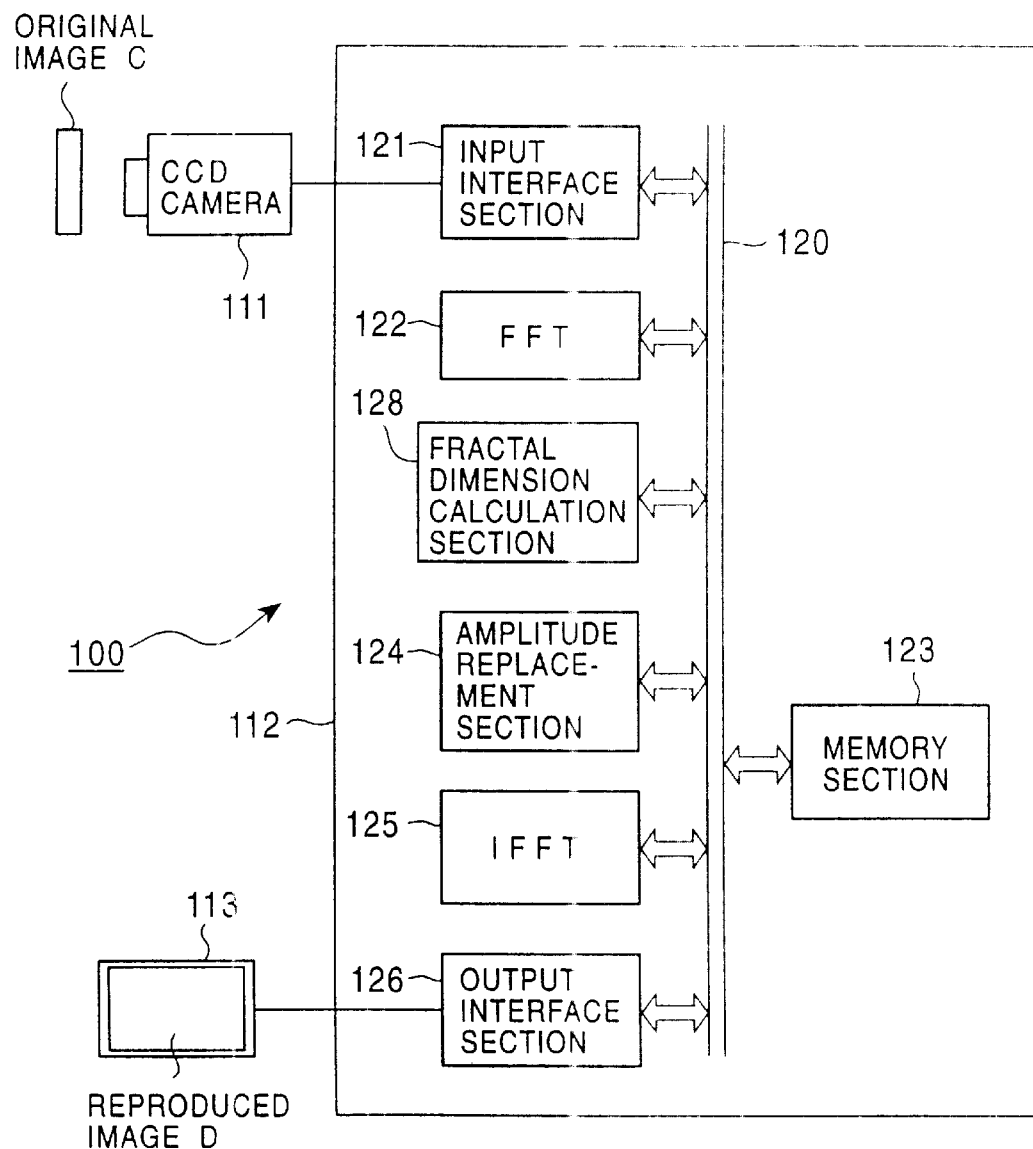
FIG. 9 is a block diagram showing the configuration of another image processing apparatus in accordance with the present invention.

The present invention can also be practiced with an image processing apparatus 100 arranged as shown in FIG. 9, for example.

The image processing apparatus 100 shown in FIG. 9 has an image pickup unit 111 which images an original image C, a signal processing unit 112 which is supplied with data of original image C from the image pickup unit 111, and a display unit 113 which is supplied with image data from the signal processing unit 112.

The image pickup unit 111 is formed of a CCD camera, for example. The image pickup unit 111 is arranged to image the entire original image C and to supply image data representing the original image C to the signal processing unit 112.

The signal processing unit 112 is formed of a microcomputer with functional components including an input interface section 121, a fast Fourier transform (FFT) section 122, a memory section 123, an amplitude replacement section 124, an inverse fast Fourier transform (IFFT) section 125, and an output interface section 216. The signal processing unit 112 also has a fractal dimension calculation section 128. These sections are connected to a bus 120.

In this signal processing unit 122, the FFT section 122 performs fast Fourier transform of image data of original image C input from image pickup unit 111 via the input interface section 121.

The fractal dimension calculation section 128 is arranged to calculate a fractal dimension of an amplitude distribution with respect to the distance from the center of the Fourier complex plane obtained by the FFT section 122.

The amplitude replacement section 124 performs processing for replacing an amplitude distribution of points on the Fourier complex plane obtained by the FFT section 122 with a predetermined function using a fractal dimension obtained by the fractal dimension calculation section 128.

The IFFT section 125 forms image data of a reproduced image D corresponding to the original image C by inverse Fourier transform from a phase distribution of the points on the Fourier transform from a phase distribution of the points on the Fourier complex plane obtained by the FFT section 122 and the amplitude distribution substituted by the amplitude replacement section 124.

The display unit 113 in this image processing apparatus 100 is formed of a CRT display or the like and displays reproduced image D corresponding to image data output from the output interface section 126 of the signal processing unit 112.

Figure 10:
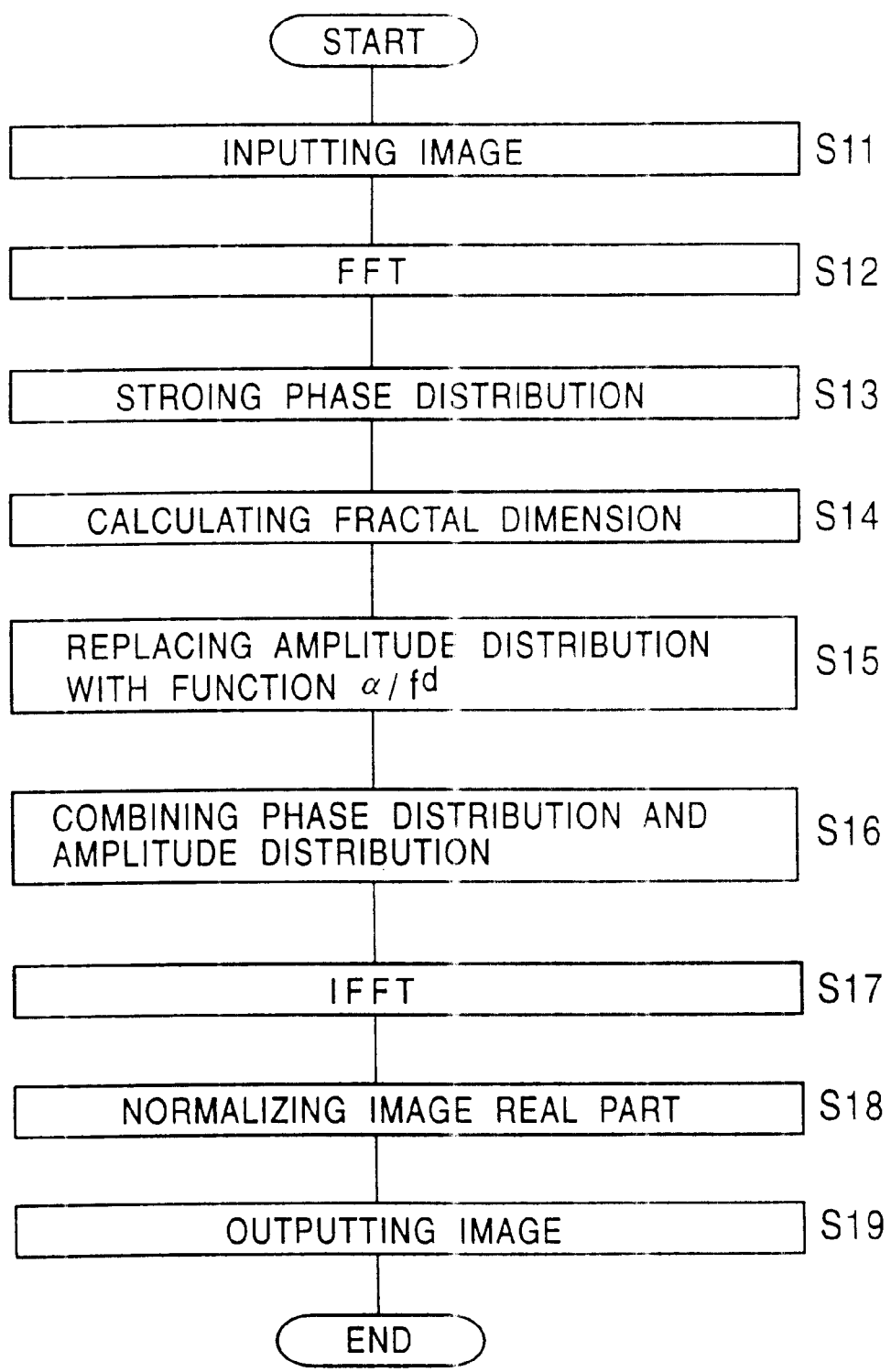
FIG. 10 is a flowchart of the process of processing an image with the image processing apparatus shown in FIG. 9.

In this image processing apparatus 100, image processing is performed in accordance with the process shown in the flowchart of FIG. 10.

First step S11 is an image input step of inputting original image C to be processed. In step S11, original image C is imaged by the image pickup unit 111 to form image data f (x, y) of original image C1 to be processed. This image data is input to the input interface section 121 of the signal processing unit 112 to be stored in the memory section 123 via the bus 120.

The next step S12 is a step of performing Fourier transform of the input image. In step S12, two-dimensional fast Fourier transform (FFT) of image data f (x, y) stored in the memory section 123 is performed to obtain frequency components of original image C.

More specifically, the FFT section 122 executes processing for the calculation shown above by equation (1) with respect to image data f(x, y) stored in the memory section 123 to form transformed complex number data F (ωx, ωy) formed of a real part A (ωx, ωy) and an imaginary part B (ωx, ωy). This transformed complex number data F (ωx, ωy) is expressed in polar coordinates as shown above by equation (2).

In step S13, a phase distribution θ (ωx, ωy) is stored in the memory section 123.

Step S14 is a fractal dimension calculation step of calculating a fractal dimension of an amplitude distribution. In step S14, a fractal dimension of an amplitude distribution with respect to the distance from the center of the Fourier complex plane obtained by the above-described Fourier transform are calculated by the fractal dimension calculation section 128.

That is, while each of points of original image C is formed only of a real part, each of the points after Fourier transform corresponding to frequency components is formed of a real part and an imaginary part. Therefore, it is converted into an R-θ coordinate system (polar coordinate system), in which the R coordinate represents the intensity of a frequency component and the θ coordinate represents the phase of a frequency component.

The image processing unit 110 extracts features of original image C by using the R coordinate. The frequency plane is expressed in the X-Y coordinate system, as is the original image. On the frequency plane obtained by two-dimensional FFT, a central area corresponds to lower frequencies while a peripheral area corresponds to higher frequencies. Therefore, the R-θ coordinate system (polar coordinate) is more suitable for extraction of features.

Figure 11:
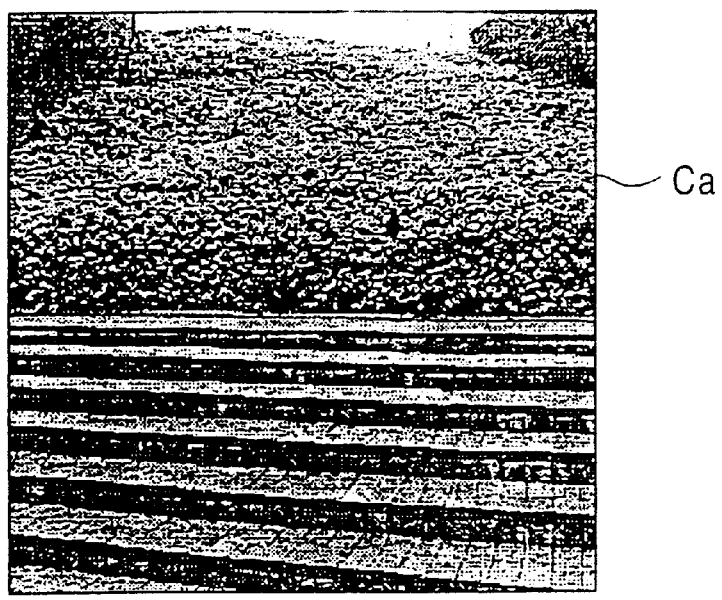
FIG. 11 is a diagram showing an original image processed by the image processing apparatus shown in FIG. 9.
Figure 12:
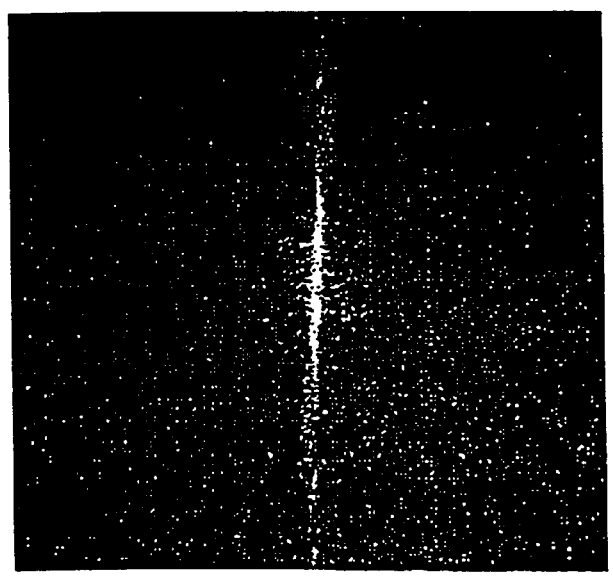
FIG. 12 is a diagram showing a frequency component distribution diagram obtained by fast Fourier transform of the original image shown in FIG. 11.
Figure 13:
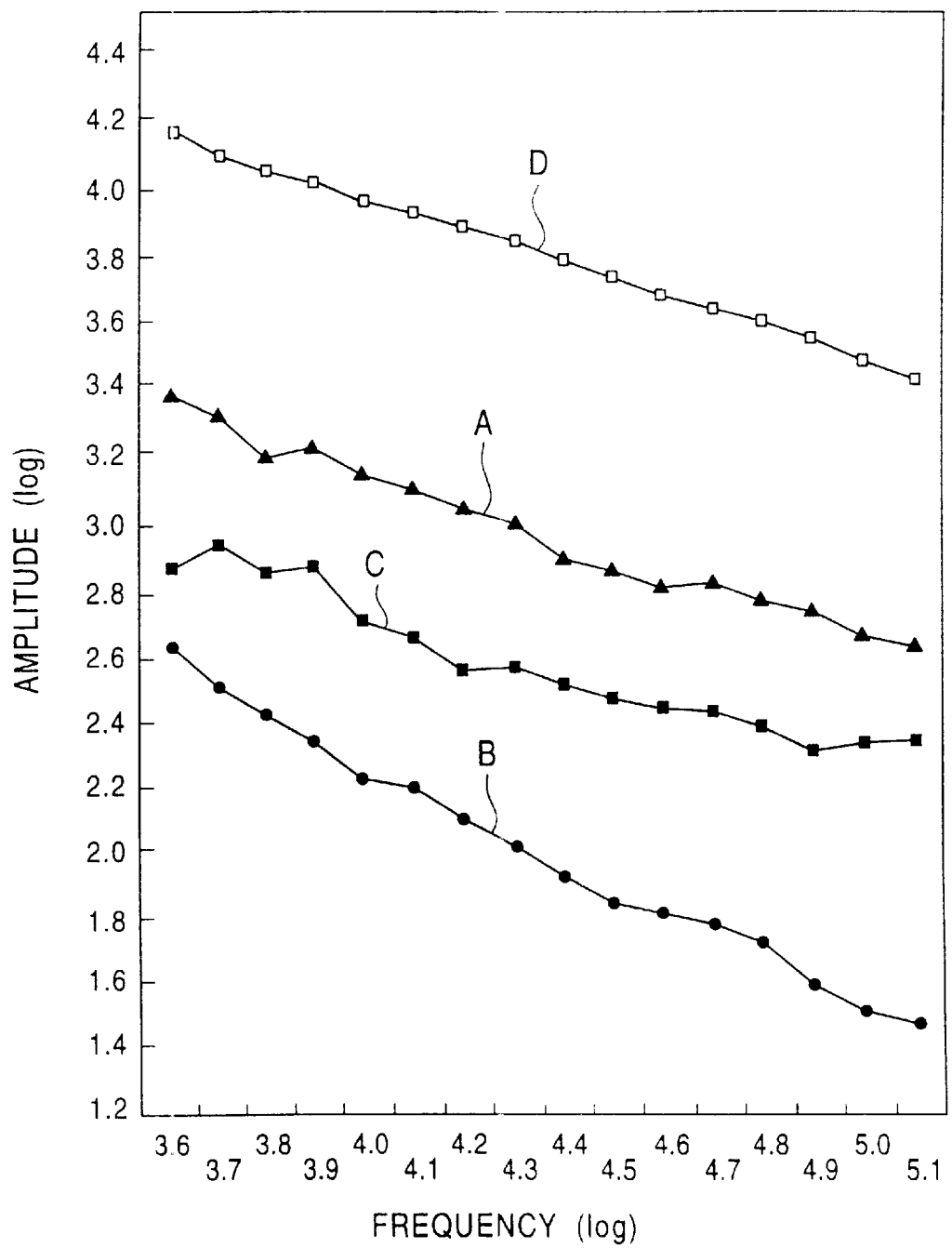
FIG. 13 is a diagram showing characteristic lines obtained by plotting the amplitude corresponding to the R coordinate with respect to background portions of the original image in the case where the original image is converted into polar coordinates after fast Fourier transform.
Figure 14:
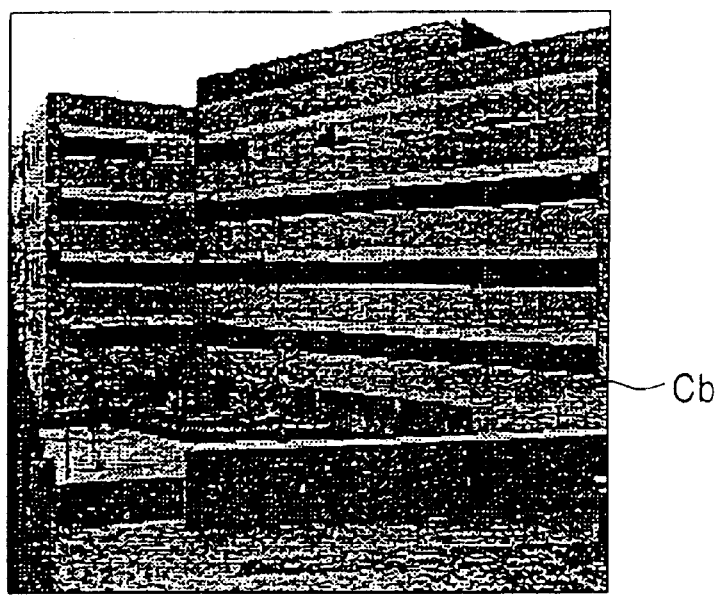
FIG. 14 is a diagram showing another original image processed by the image processing apparatus shown in FIG. 9.
Figure 15:
FIG. 15 is a diagram showing another original image processed by the image processing apparatus.
Figure 16:
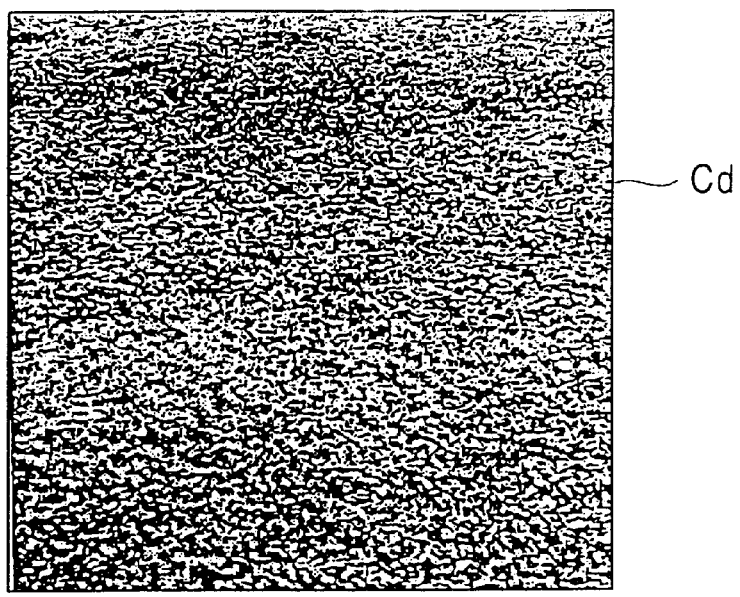
FIG. 16 is a diagram showing another original image processed by the image processing apparatus shown in FIG. 9.

FIG. 12 shows an amplitude distribution of frequency components obtained as a result of FFT of an original image Ca shown in FIG. 11. As is apparent from FIG. 12, the amplitude distribution after two-dimensional FFT is characterized by a peak portion having a particular θ component and other background portions. It is thought that a portion of high periodicity of the original image Ca shown in FIG. 11 can be extracted from the peak portion while other general features of the image can be extracted from the background portions. If the amplitude corresponding to the R coordinate is plotted with respect to the background portions, a characteristic line A shown in FIG. 13 is obtained. Similarly, amplitude distributions after two-dimensional FFT of original images Cb, Cc, and Cd shown in FIGS. 14, 15, and 16 are such that, if the amplitude corresponding to the R coordinate is plotted with respect to background portions, characteristic lines B, C, and D shown in FIG. 13 are obtained.

The abscissa in FIG. 13 represents the logarithm of the frequency, i.e., the distance from the center point of the amplitude distribution image while the ordinate represents the logarithm of the amplitude value. If the data is plotted in terms of logarithm on the two axes, and if the original data has a fractal characteristic, the plotted line is linear and the negative of the inclination represents a fractal dimension d.

If the fractal dimension d is used, the original data can be approximated by a function of $\alpha/f^d$ type (a: constant). In step S15, therefore, the amplitude distribution of the frequency component f (R polar coordinate) in the above-described R-θ coordinate system is replaced with the function $\alpha/f^d$. That is, step S15 is a replacement step of replacing the amplitude distribution R (ωx, ωy) of each of points on the Fourier complex plane obtained by the above-described FFT with the function $\alpha/f^d$ using the above-described fractal dimension d, as shown by equation (10).

$$R(f^d) = \frac{\alpha}{f^d}$$

$$\therefore f = \sqrt{\omega x^2 + \omega y^2}$$

$$R(\omega x, \omega y) = \alpha(wx^2 + wy^2)^{-d/2} \tag{10}$$

Next, in step S16, the amplitude distribution R (ωx, ωy) thus substituted and shown by equation (9) is converted from the R-θ coordinate system to the X-Y coordinate system and is combined with the phase distribution θ (ωx, ωy) read from the memory section 123 in which the phase distribution is stored in step S3, thereby obtaining the R-θ coordinate value of the complex number value of each point. Then, based on equation (2) shown above, transformed data $F_1$ (ωx, ωy) shown by the following equation (11) obtained.

$$F_1(\omega x, \omega y) = (R \cos \theta, R \sin \theta) \tag{11}$$

Further, the real part $A_1$ (ωx, ωy) and the imaginary part $B_1$ (ωx, ωy) of each point are calculated to convert the transformed data $F_1$ (ωx, ωy) shown above by equation (4) into a complex number as shown above by equation (5).

Step S17 is an inverse transform step of performing inverse Fourier transform. In step S17, inverse Fourier transform of the transformed data $F_1$ (ωx, ωy) shown by equation (5) is performed in the IFFT section to form image data $f_1$ (x, y) of each point shown by equation (6).

From such inverse Fourier transform, occurrence of some points having negative real part $A_2$ (x, y) results. In step S18, therefore, a conversion operation is performed to normalize all the real parts of the points so that all the pixel values become not smaller than 0. That is, step S18 is a real part conversion step in which the values of the real parts of the image points formed in the above-described inverse conversion step are changed so that the minimum of the real part values is not smaller than 0. More specifically, in step S18, the maximum value $A_2$max and minimum value $A_2$min of the real parts $A_2$ (x, y) of the points forming the output image obtained by inverse Fourier transform are calculated, the calculation shown above by the following equation (7) is performed with respect to each pixel, and normalized real parts $A_4$ (x, y) are obtained by the calculation shown above in equation (8).

Thus, in step S18, the real parts $A_2$ (x, y) obtained as a result of FFT and including negative values are normalized to real parts $A_4$ (x, y) such that all the pixel values are not smaller than 0 regardless of the constant a in the function $\alpha/f^d$.

In step S19, an image corresponding to the image data of the real parts $A_4$ (x, y) thus formed is output.

Figure 17:
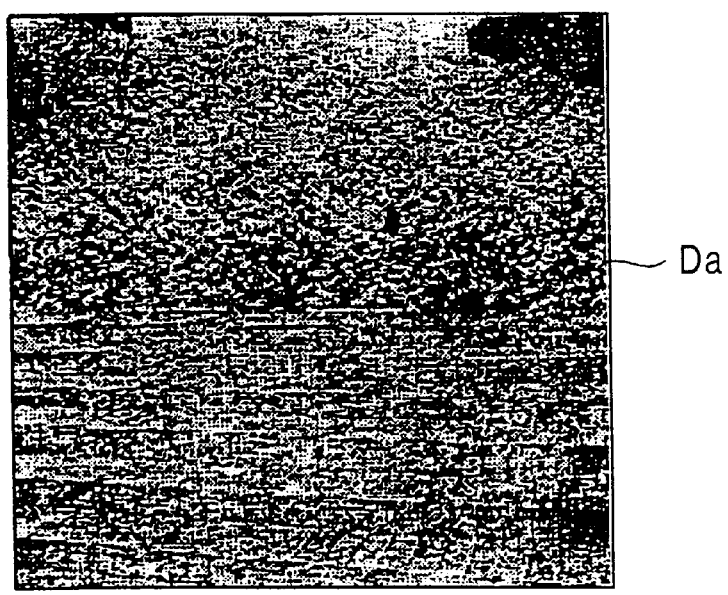
FIG. 17 is a diagram showing an image obtained by processing the original image shown in FIG. 11 with the image processing apparatus shown in FIG. 9.
Figure 18:
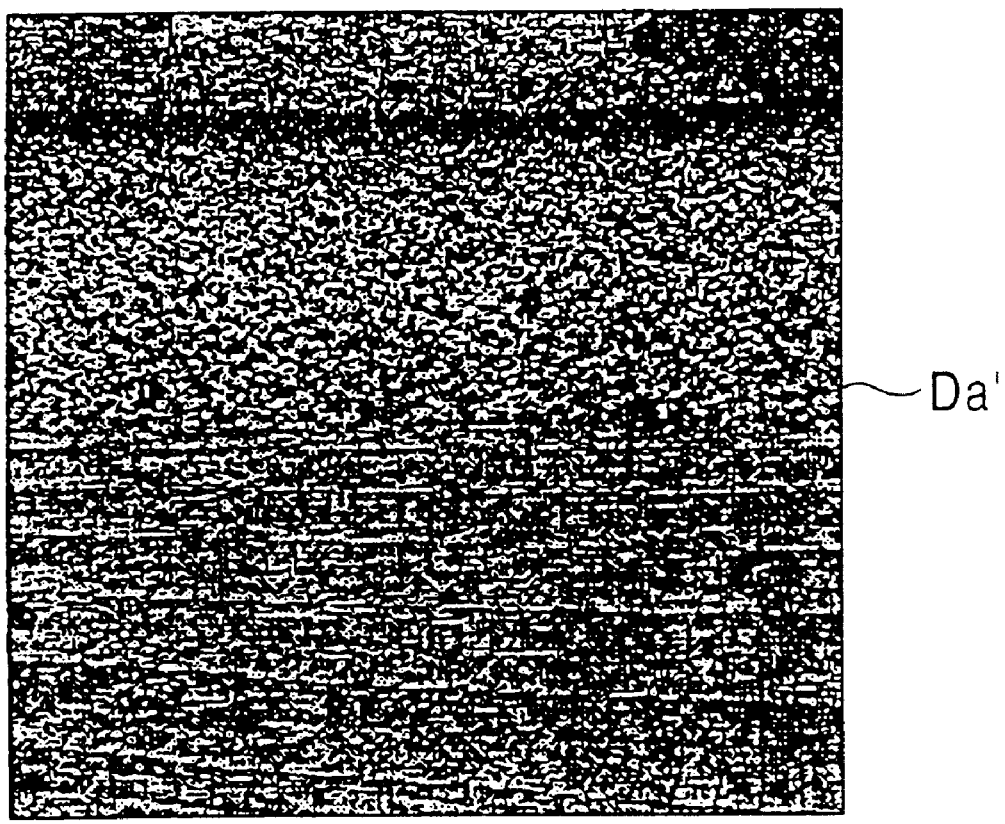
FIG. 18 is a diagram showing an image obtained by processing the original image shown in FIG. 11 when the fractal dimension is set to 1.

FIG. 17 shows an image Da which was obtained by actually performing the above-described operation with respect to the image Ca shown in FIG. 11. FIG. 18 shows an image Da' for comparison, which was obtained by setting the fractal dimension to "1". As is apparent from the comparison between the images Da and Da', the original image can be reproduced with higher fidelity when the fractal dimension d of the input image C is used.

As described above, in this image processing apparatus 100, image data f (x, y) of the original image C is obtained by imaging the entire original image C with the image pickup unit 111; transformed data F (ωx, ωy) is obtained from the image data f (x, y) by fast Fourier transform performed in the above-described signal processing unit 112; the amplitude distribution R (ωx, ωy) of the transformed data F (ωx, ωy) is replaced with the predetermined function $\alpha/f^d$ using fractal dimension d; and reproduced image D is thereafter obtained by inverse fast Fourier transform. Therefore, features of the entire original image C can be extracted in a widely-viewing manner.

Since the entire original image C is processed by being input at a time, occurrence of block-like noise such as that observed after inverse transform in the conventional art can be avoided and the image pickup and image processing can be efficiently performed in a short time.

Also in this image processing apparatus 100, FFT may be optically performed with the image pickup optical system which images original image C, as is that in the image processing apparatus described with reference to FIG. 8. If FFT is performed in this manner to obtain the amplitude distribution R (ωx, ωy) and phase distribution θ (ωx, ωy) of a two-dimensional FFT image of the original image C, the need for the step of performing two-dimensional FFT of an input image, corresponding to step S12 in the flowchart of FIG. 10, can be eliminated and only the processing after step S14 are performed. Inverse fast Fourier transform may also be performed by optical means to further reduce the load on the signal processing unit 32 to increase the image processing speed.

Figure 19:
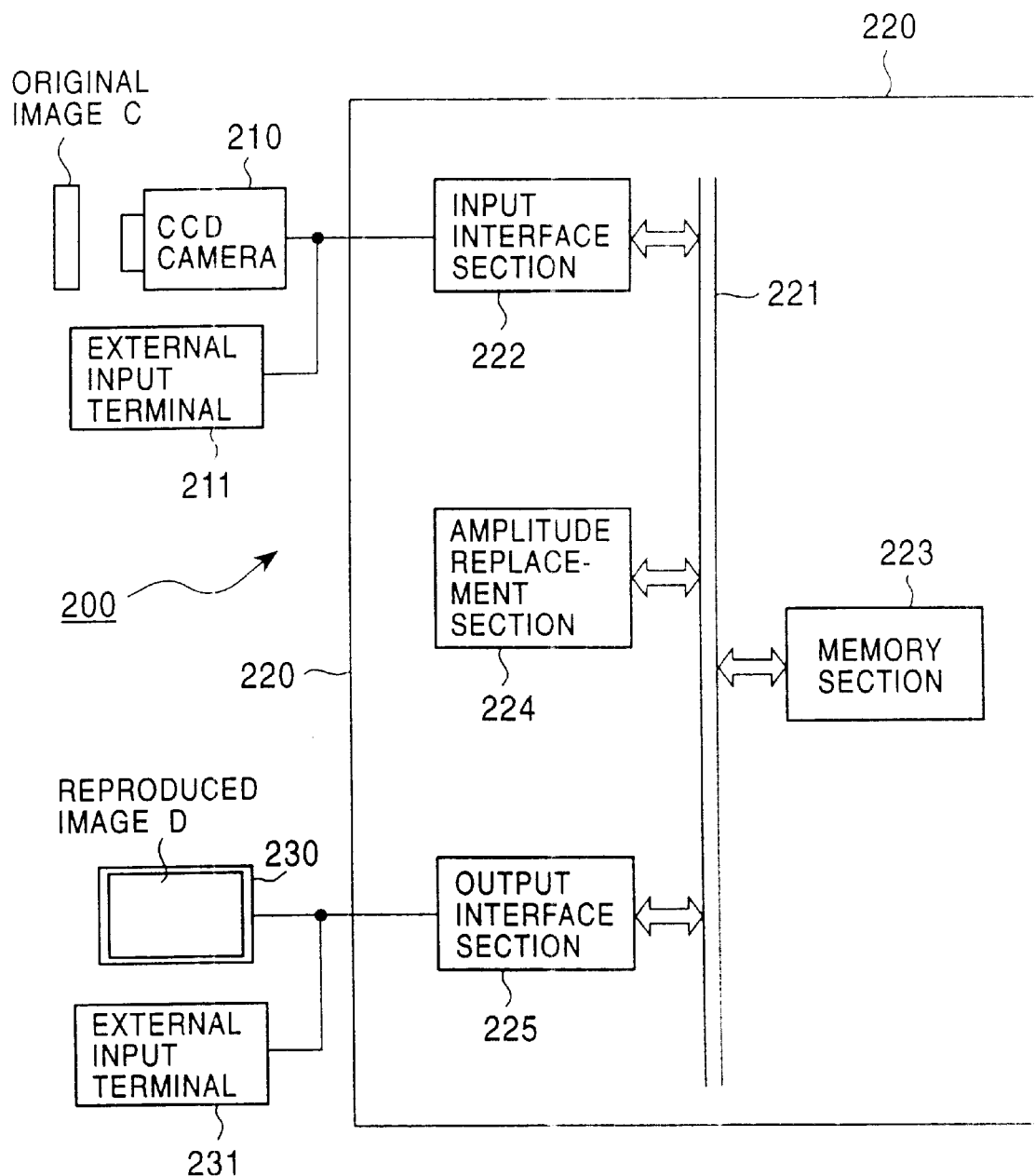
FIG. 19 is a block diagram showing the configuration of a further image processing apparatus in accordance with the present invention.

The present invention can also be practiced with an image processing apparatus 200 arranged as shown in FIG. 19, for example.

The image processing apparatus 200 shown in FIG. 19 has an image pickup unit 210 and an external input terminal 211 for inputting original image C, a signal processing unit 220 which is supplied with data of original image C from the image pickup unit 210 or the external input terminal 211, and a display unit 230 and an external output terminal 231 which is supplied with image data from the signal processing unit 220.

The image pickup unit 210 is formed of a CCD camera, for example. The image pickup unit 210 is arranged to image the entire original image C and to supply image data representing the original image C to the signal processing unit 220.

The signal processing unit 220 is formed of a microcomputer with functional components including an input interface section 222, a memory section 223, an amplitude replacement section 124, a calculation section 224, and an output interface section 225. These sections are connected to a bus 221.

The display unit 230 in this image processing apparatus 200 is formed of a CRT display or the like and displays reproduced image D corresponding to image data output from the output interface section 225 of the signal processing unit 220.

A computer capable of processing or using an image, an image scanner, a digital camera, storage unit, a video recording and reproducing apparatus, television receiver, a portable information terminal or the like can be connected to the external input terminal 211 or external output terminal 231.

In this image processing apparatus 200, image data of original image C is input from the image pickup unit 210 or the external input terminal 211 to the input interface section 222 of the signal processing unit 220 and is stored in the memory section 223 via the bus 221. The image data stored in the memory section 223 is processed by the calculation section 224 in accordance with the flowchart of FIG. 20. Image data processed by certain processing in the calculation section 224 is output to the display unit 230 or the external output terminal 231 through the output interface section 225.

Figure 20:
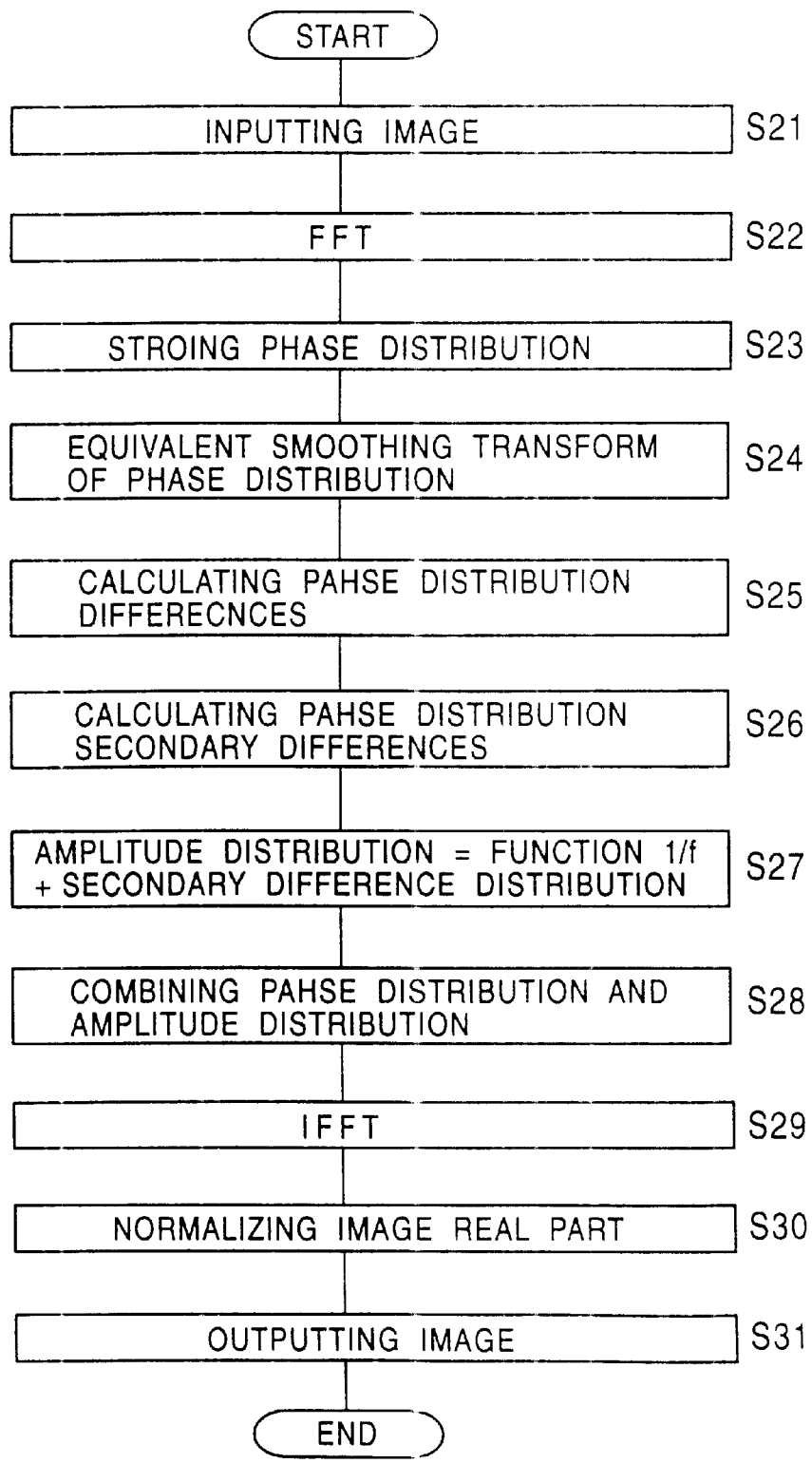
FIG. 20 is a flowchart of the process of processing an image with the image processing apparatus shown in FIG. 19.

That is, in this image processing apparatus 200, image processing is performed in accordance with the process shown in the flowchart of FIG. 20.

First step S21 is an image input step of inputting original image C to be processed. In step S21, image data f(x, y) of original image C1 to be processed is input from the image pickup unit 210 or the external input terminal 211 to the input interface section 212 of the signal processing unit 210 and is stored in the memory section 223 via the bus 211.

The next step S22 is a step of performing Fourier transform of the input image. In step S212, two-dimensional fast Fourier transform (FFT) of image data f (x, y) stored in the memory section 223 is performed to obtain frequency components of original image C.

More specifically, processing for the calculation shown above by equation (1) with respect to image data f (x, y) stored in the memory section 223 is executed to form transformed complex number data F (ωx, ωy) formed of a real part A (ωx, ωy) and an imaginary part B (ωx, ωy). This transformed complex number data F (ωx, ωy) is expressed in polar coordinates as shown above by equation (2).

In step S23, a phase distribution θ (ωx, ωy) is stored in the memory section 223.

Figure 21:
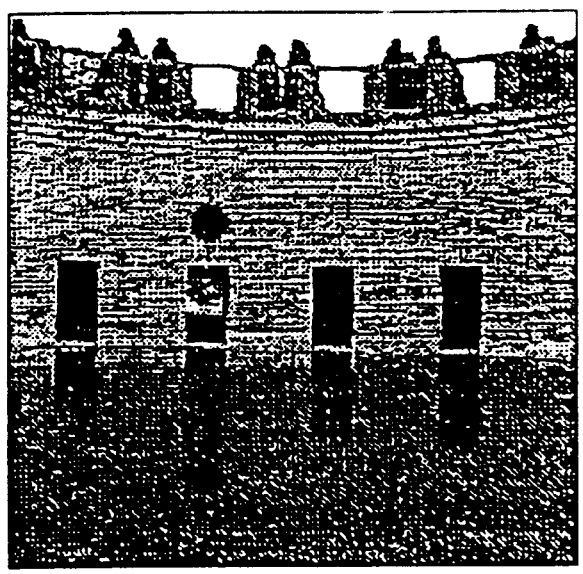
FIG. 21 is a diagram showing an original image processed by the image processing apparatus shown in FIG. 19.
Figure 22:
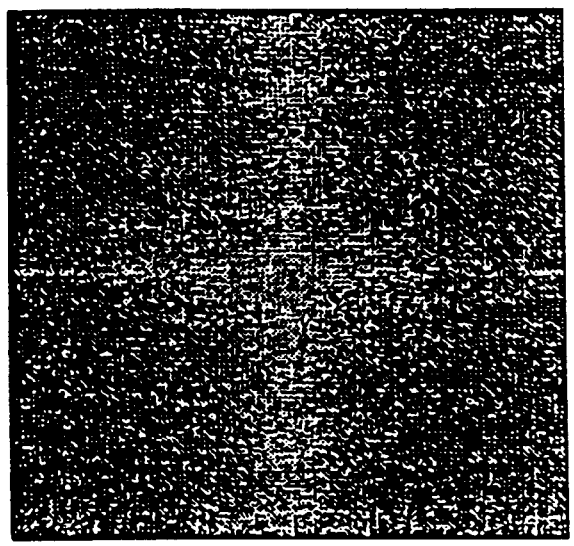
FIG. 22 is a diagram showing an amplitude distribution after fast Fourier transform of the original image shown in FIG. 21.
Figure 23:
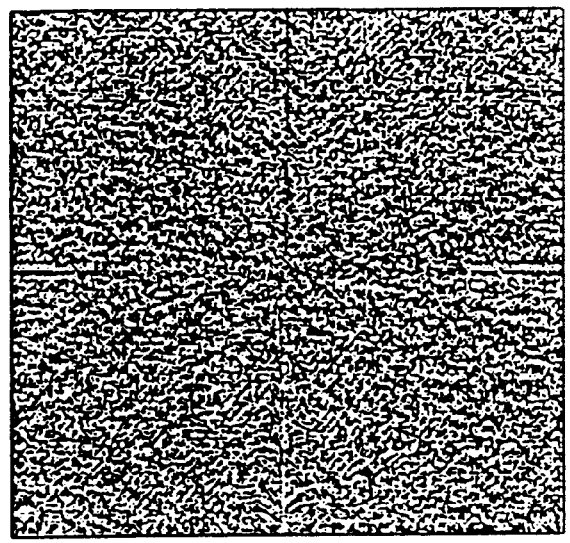
FIG. 23 is a diagram showing a phase distribution after fast Fourier transform of the original image shown in FIG. 21.

FIG. 22 shows an amplitude distribution of frequency components obtained by performing FFT of an original image shown in FIG. 21. FIG. 23 shows a phase distribution of this data.

Referring to FIG. 22, the amplitude distribution after two-dimensional FFT is an image in which a characteristic pattern according to the original image is exhibited in a distribution close to the 1/f distribution. On the other hand, the phase distribution appears like generally random noise, so that it is difficult to immediately extract features of the image. Since the phase distribution is complicated in the range between −π and +π, it is possible that extraction of a feature amount will become easier if the phase distribution is developed out of the range between −π and +π so as to continue as smoothly as possible.

In step S24, therefore, the image processing unit 200 advances smoothing transform starting from the phase of a point on the y-axis (fy-axis) in the two-dimensional frequency space in the ±fx direction. The smoothing transform is an operation of adding 2nπ (n: integer) to the phase value of a certain point such that the amount of change from the phase value of the preceding point is within the range of ±π. Since the phase value has a period of 2π, it is not changed even if 2nπ is added to it.

Figure 24:
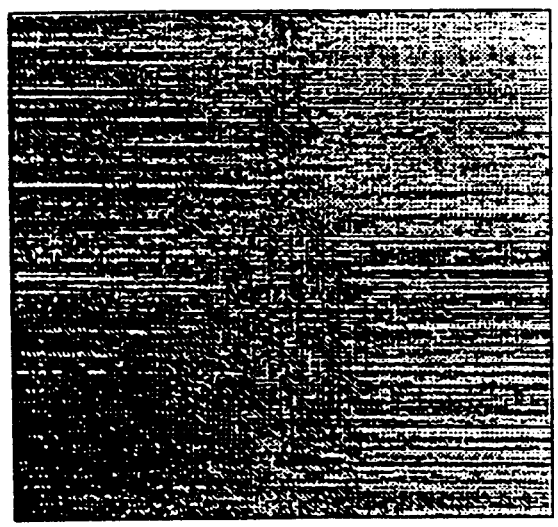
FIG. 24 is a diagram showing a phase distribution obtained by performing equivalent smoothing transform of the phase distribution shown in FIG. 23.

A phase distribution obtained by performing smoothing transform of the phase distribution shown in FIG. 23 is lateral-striped as shown in FIG. 24.

Next, in step S25, from the phase distribution thus smoothing-transformed, differences are extracted in the same direction as the direction in which the smoothing transform is advanced.

Figure 25:
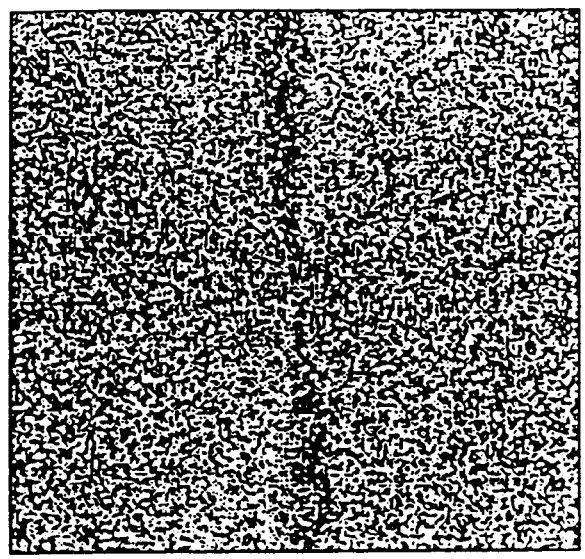
FIG. 25 is a diagram showing a distribution of primary differences in the phase distribution shown in FIG. 23.

FIG. 25 shows a phase distribution obtained by extracting differences in the phase distribution shown in FIG. 24.

As shown in FIG. 25, in the phase distribution obtained by extracting differences, a characteristic pattern appears which resembles the amplitude distribution after two-dimensional FFT shown in FIG. 22. This difference phase distribution, however, is anti-symmetric about the frequency axes (fx-axis, fy-axis) and is different in expression from the amplitude distribution symmetric about the frequency axes (fx-axis, fy-axis).

Then, in step S26, differences are further extracted in the same manner from the difference phase distribution. This is an operation of obtaining secondary differences.

Figure 26:
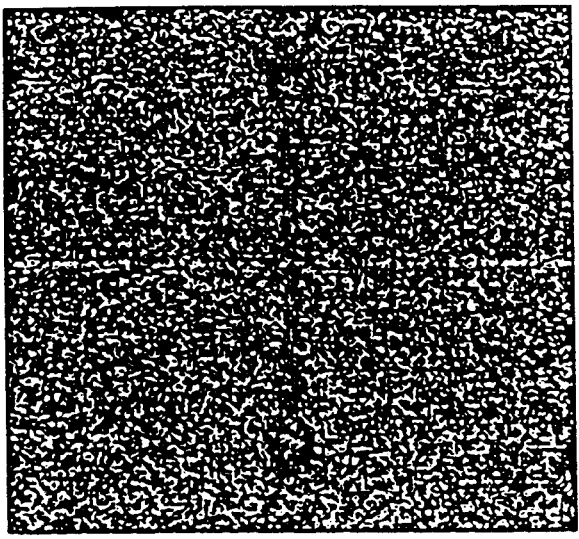
FIG. 26 is a diagram showing a distribution of secondary differences in the phase distribution shown in FIG. 25.

FIG. 26 shows a distribution obtained by extracting secondary differences of the phase distribution.

This secondary-difference distribution of the phase distribution has a pattern similar to that in the amplitude distribution after two-dimensional FFT shown in FIG. 22. Also, it is symmetric about the frequency axes (fx-axis, fy-axis). Also in this respect, it is similar to that amplitude distribution.

In step S26, the secondary-difference distribution of the phase distribution is obtained by the calculation section 224 and is stored in the memory section 223.

Step S27 is an amplitude replacement step. In step S27, the 1/f distribution is used as a primary approximation to the amplitude distribution because the amplitude distribution after two-dimensional FFT is an isotropic pattern generally close to 1/f except for anisotropic component corresponding to pattern specific to the image. Next, the distribution obtained by extracting secondary differences of the phase distribution as described above is combined with the 1/f distribution. That is, the secondary-difference distribution of the phase distribution is multiplied by a suitable coefficient and the result of this multiplication is added to or subtracted from the 1/f distribution. The amplitude distribution is replaced with the result of this additional or subtraction.

Figure 27:
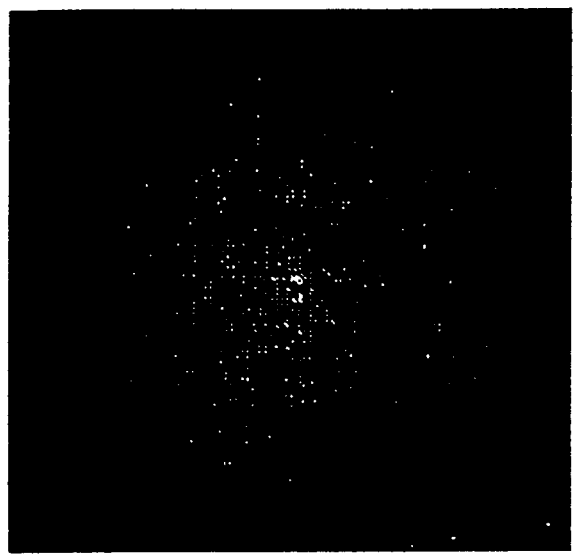
FIG. 27 is a diagram showing a 1/f distribution.
Figure 28:
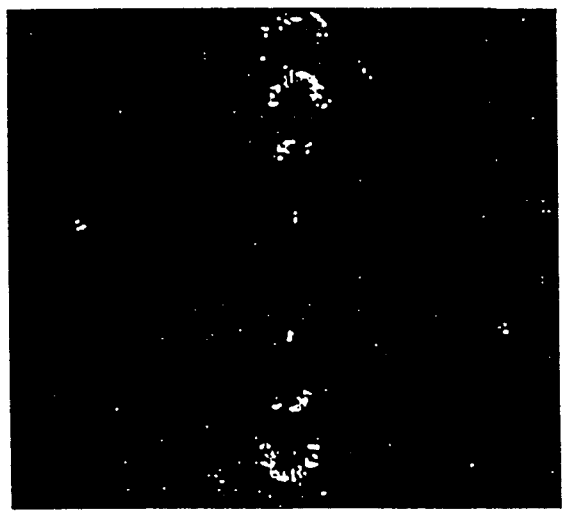
FIG. 28 is a diagram showing the result of multiplying by a certain coefficient the secondary difference distribution of the phase distribution shown in FIG. 26.
Figure 29:
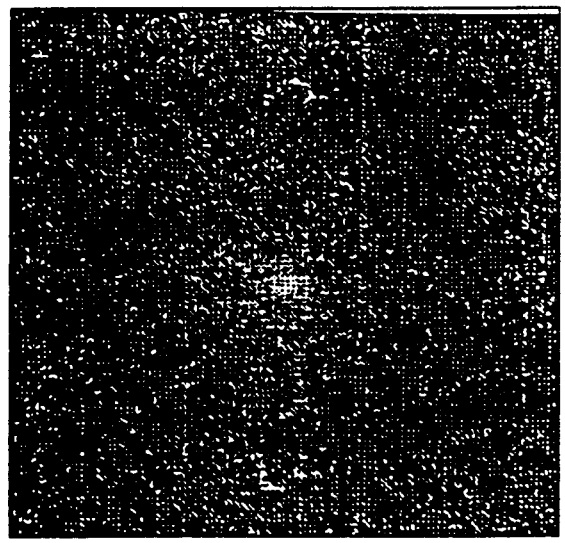
FIG. 29 is a diagram showing the result of combining the 1/f distribution shown in FIG. 25 and the secondary difference distribution of the phase distribution shown in FIG. 26.

FIG. 27 shows the 1/f distribution and FIG. 28 shows the distribution obtained by multiplying the secondary-difference distribution of the phase distribution multiplied by a certain coefficient. The distribution obtained by combining these two distributions is as shown in FIG. 29. The distribution shown in FIG. 29 is used as an amplitude distribution.

In step S28, the phase distribution stored in the memory section 223 in step S23 is read out and is combined with the substitute amplitude distribution, and the real and imaginary parts of each point on the Fourier complex plane are calculated.

In step S29, inverse Fourier transform of the image formed of the real and imaginary parts of the points on the Fourier complex plane obtained in step S28 is performed, thus obtaining an image close to the original image.

The image obtained by such inverse Fourier transform has some points having negative real part results unlike the image input in step S21. In step S30, to correctly express such points on the two-dimensional screen, a conversion operation is performed to normalize all the real parts of the points so that all the pixel values become not smaller than 0.

In step S31, an image corresponding to the image data thus formed is output.

Figure 30:
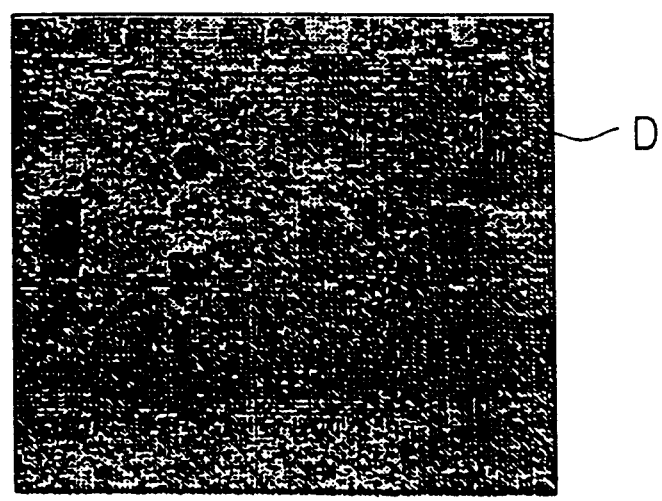
FIG. 30 is a diagram showing a reproduced image in the case where the 1/f distribution shown in FIG. 25 is used as an amplitude distribution.
Figure 31:
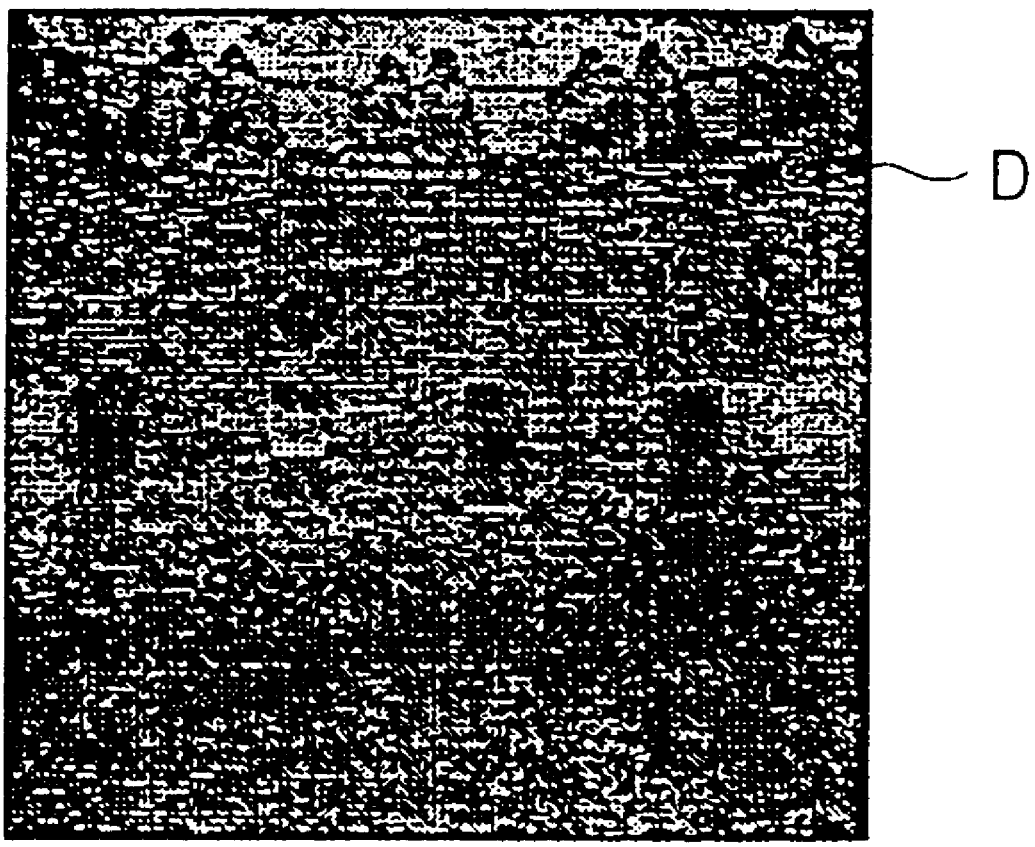
FIG. 31 is a diagram showing a reproduced image in the case where the combined distribution shown in FIG. 29 is used as an amplitude distribution.

FIG. 30 shows a reproduced image D' which is obtained by using as an amplitude distribution the 1/f distribution shown in FIG. 27 with respect to the original image shown in FIG. 21, and FIG. 31 shows a reproduced image D which is obtained by combining the 1/f distribution and the distribution obtained by multiplying the secondary-difference distribution of the phase distribution by a certain coefficient to form the distribution shown in FIG. 29, and by using this distribution as an amplitude distribution.

From comparison between the reproduced images D' and D, it can be recognized that the reproduced image D shown in FIG. 31 is better in terms of, for example, reproduction of wall surface patterns seen in the original image C.

In the above described embodiment, steps S25 and S26 can be similarly extracted by differentials instead of differences. In this case, step 25 is extracted by the phase distribution differentiated in the same direction as the direction in which the smoothing transform is advanced in step S24. A differential of the phase distribution $\partial\Phi(\omega x, \omega y)/\partial\omega$ is obtained by calculation of the following equation (12) by using the real part A(ωx, ωy) and the imaginary part B(ωx, ωy) extracted from the fast Fourier transform, respective differentials A'(ωx, ωy), B'(ωx, ωy), and the amplitude distribution R(ωx, ωy).

$$\frac{\partial\Phi(\omega x, \omega y)}{\partial w} = \frac{A(\omega x, \omega y)B'(\omega x, \omega y) - B(\omega x, \omega y)A'(\omega x, \omega y)}{R^2(\omega x, \omega y)} \quad (12)$$

In equation (12), an absolute value of the differential of the phase component in larger amplitude part becomes smaller and uniformity is increased because of square amplitude $R^2$ (ωx, ωy) in the denominator.

Next, in step S26, instead of the secondary difference distribution, a secondary-differential distribution is calculated. In step S26, the secondary-differential distribution of the phase distribution $\partial^2\Phi(\omega x, \omega y)/\partial\omega^2$ obtained by calculation of the following equation (13) by using the real part A(ωx, ωy) and the imaginary part B(ωx, ωy) extracted from the fast Fourier transform, respective differentials A'(ωx, ωy), B'(ωx, ωy), and secondary differentials A''(ωx, ωy), B''(ωx, ωy) and the amplitude distribution R(ωx, ωy)

$$\frac{\partial^2 \Phi(\omega x, \omega y)}{\partial^2 \omega} = \qquad (13)$$

$$\frac{2[B(\omega x, \omega y)A'(\omega x, \omega y) - A(\omega x, \omega y)B'(\omega x, \omega y)]}{R^4(\omega x, \omega y)} + A(\omega x, \omega y)A'(\omega x, \omega y)] +$$

$$\frac{B(\omega x, \omega y)A''(\omega x, \omega y) - A(\omega x, \omega y)B''(\omega x, \omega y)}{R^2(\omega x, \omega y)}$$

In equation (13), similar to equation (12), an absolute value of the secondary-differential of the phase component in larger amplitude part becomes smaller and uniformity is increased because of a section of four times multiplier $R^4$ ($\omega x$, $\omega y$) and a section of square amplitude $R^2$ ($\omega x$, $\omega y$) in the denominator.

Additionally, in next step S27, the newly extracted amplitude distribution is obtained by the similar way as previously described.

According to the present invention, as described above, with respect to image data of an original image obtained by imaging the entire original image, an amplitude distribution of transformed data obtained from the image data by fast Fourier transform is replaced with a predetermined function, and a reproduced image is thereafter obtained by inverse fast Fourier transform. Therefore, features of the entire original image can be extracted in a widely-viewing manner. Moreover, since the entire original image is processed by being input at a time, occurrence of block-like noise such as that observed after inverse transform in the conventional art can be avoided and the image pickup and image processing can be efficiently performed in a short time.

Further, according to the present invention, with respect to image data of an original image obtained by imaging the entire original image, an amplitude distribution of transformed data obtained from the image data by fast Fourier transfer is replaced with a predetermined function using a fractal dimension, and a reproduced image is thereafter obtained by inverse fast Fourier transform, thereby reproducing the original image with higher fidelity.

According to the present invention, therefore, occurrence of block-like noise such as that observed after inverse transform in the conventional art can be avoided and features of the original image can be extracted in a widely-viewing manner to reproduce the original image with high fidelity.

What is claimed is:

1. An apparatus for processing an image comprising:
   an image input section for inputting an original image;
   a transform section for performing Fourier transform of the input image;
   a fractal dimension calculation section for calculating a fractal dimension of an amplitude distribution with respect to the distance from a center point of a Fourier complex plane obtained by said transform section;
   an amplitude replacement section for replacing an amplitude distribution of points on the Fourier complex plane obtained by said transform section with a predetermined function using the fractal dimension calculated by said fractal dimension calculation section; and
   an inverse transform section for forming an image corresponding to the original image by inverse Fourier transform from a phase distribution of the points on the Fourier complex plane obtained by said transform section and from an amplitude distribution obtained by the replacement performed by said amplitude replacement section.

2. An apparatus according to claim 1, wherein said amplitude replacement section replaces the amplitude distribution with a function shown as $\alpha/f^d$ where f is the spatial frequency of the input image corresponding to the distance from the center point of the Fourier complex plane, d is the fractal dimension, and $\alpha$ is a predetermined constant.

3. An apparatus according to claim 1, further comprising a real part conversion section for changing the real parts of points of the image formed by said inverse transform section so that the minimum of the real parts is not smaller than 0.

4. An apparatus according to claim 1, wherein at least one of said transform section and said inverse transform section performs Fourier transform or inverse Fourier transform in an optical manner.

5. An apparatus for processing an image comprising:
   an image input section for inputting an original image;
   a transform section for performing Fourier transform of the input image;
   an amplitude replacement section for replacing an amplitude distribution of points on a Fourier complex plane obtained by said transform section with a predetermined function;
   a smoothing transform section for performing equivalent smoothing transform of a phase distribution of the points on the Fourier complex plane obtained by said transform section in one of a direction along the abscissa and a direction along the coordinate;
   a difference or differential detection section for extracting differences or differentials in the phase distribution of the points on the Fourier complex plane processed by the equivalent smoothing transform performed by said smoothing transform section, the differences or differentials being extracted along the direction of the smoothing transform;
   a secondary difference or differential detection section for further extracting differences or differentials in a phase distribution obtained by extracting differences or differentials by said difference or differential detection section;
   a combining section for combining an amplitude distribution obtained by the replacement performed by said amplitude replacement section, and the secondary differences or differentials in the phase distribution detected by said secondary difference or differential detection section, said combining section replacing the amplitude distribution with the result of said combining; and
   an inverse transform section for forming an image corresponding to the original image by inverse Fourier transform from the phase distribution of the points on the Fourier complex plane obtained by said transform section and from the amplitude distribution obtained by the combining performed by said combining section.

6. An apparatus according to claim 5, wherein said predetermined function comprises a 1/f function using as a parameter a spatial frequency f of the input image corresponding to the distance from a center point of the Fourier complex plane.

7. An apparatus according to claim 5, wherein said smoothing transform section has a means for adding $2n\pi$ (n: integer) to each of the points starting from a phase value on one of the coordinate and the abscissa of the Fourier complex plane such that the amount of change between the phase values of each pair of the points adjacent to each other in one of a direction along the coordinate and a direction along the abscissa is within the range of $\pm\pi$.

8. An apparatus according to claim 5, wherein at least one of said transform section and said inverse transform section performs Fourier transform or inverse Fourier transform by using a fast Fourier transform algorithm.

9. A method of processing an image comprising:
an image input step of inputting an original image;
a transform step of performing Fourier transform of the input image;
a fractal dimension calculation step of calculating a fractal dimension of an amplitude distribution with respect to the distance from a center point of a Fourier complex plane obtained by the Fourier transform;
an amplitude replacement step of replacing an amplitude distribution of points on the Fourier complex plane obtained by the Fourier transform with a predetermined function using the fractal dimension; and
an inverse transform step of forming an image by inverse Fourier transform from a phase distribution of the points on the Fourier complex plane obtained by the Fourier transform and from an amplitude distribution obtained by the replacement in said amplitude replacement step.

10. A method according to claim 9, wherein, in said amplitude replacement step, the amplitude distribution is replaced with a function shown as $\alpha/f^d$ where f is the spatial frequency of the input image corresponding to the distance from the center point of the Fourier complex plane, d is the fractal dimension, and $\alpha$ is a predetermined constant.

11. A method according to claim 9, further comprising a real part conversion step of changing the real parts of points of the image formed in said inverse transform step so that the minimum of the real parts is not smaller than 0.

12. A method according to claim 9, wherein, in at least one of said transform step and said inverse transform step, Fourier transform or inverse Fourier transform is performed by using a fast Fourier transform algorithm.

13. A method of processing an image comprising:
an image input step of inputting an original image;
a transform step of performing Fourier transform of the input image;
an amplitude replacement step of replacing an amplitude distribution of points on a Fourier complex plane obtained by the Fourier transform with a predetermined function;
a smoothing transform step of performing equivalent smoothing transform of a phase distribution of the points on the Fourier complex plane obtained by the Fourier transform in one of a direction along the abscissa and a direction along the coordinate;
a difference or differential detection step of extracting differences or differentials in the phase distribution processed by the equivalent smoothing transform, the differences or differentials being extracted along the direction of the smoothing transform;
a secondary difference or differential detection step of further extracting differences or differentials in a phase distribution obtained by extracting differences or differentials in said difference detection step;
a combining step of combining an amplitude distribution obtained by the replacement with the predetermined function, and the secondary differences or differentials in the phase distribution, and replacing the amplitude distribution with the result of said combining; and
an inverse transform step of forming an image corresponding to the original image by inverse Fourier transform from the phase distribution of the points on the Fourier complex plane obtained by the Fourier transform and from the amplitude distribution obtained by said combining.

14. A method according to claim 13, wherein said predetermined function comprises a 1/f function using as a parameter a spatial frequency f of the input image corresponding to the distance from a center point of the Fourier complex plane.

15. A method according to claim 13, wherein said smoothing transform step includes a step of adding $2n\pi$ (n: integer) to each of the points starting from a phase value on one of the coordinate and the abscissa of the Fourier complex plane such that the amount of change between the phase values of each pair of the points adjacent to each other in one of a direction along the coordinate and a direction along the abscissa is within the range of $\pm\pi$.

16. A method according to claim 13, wherein, in at least one of said transform step and said inverse transform step, Fourier transform or inverse Fourier transform is performed by using a fast Fourier transform algorithm.

17. An information recording medium having an image processing program stored therein, said image processing program being readable and executable by a computer which performs a process including an image input step of inputting an entire original image at a time, a transform step of performing Fourier transform of the input image, a fractal dimension calculation step of calculating a fractal dimension of an amplitude distribution with respect to the distance from a center point of a Fourier complex plane obtained by the Fourier transform, a replacement step of replacing an amplitude distribution of points on the Fourier complex plane obtained by the Fourier transform with a predetermined function using the fractal dimension, and an inverse transform step of forming an image by inverse Fourier transform from a phase distribution of the points on the Fourier complex plane obtained by the Fourier transform and from an amplitude distribution obtained by the replacement in the amplitude replacement step.

18. A medium according to claim 17, wherein, in the amplitude replacement step, the amplitude distribution is replaced with a function shown as $\alpha/f^d$ where f is the spatial frequency of the input image corresponding to the distance from the center point of the Fourier complex plane, d is the fractal dimension, and $\alpha$ is a predetermined constant.

19. A medium according to claim 17, wherein the process further includes a real part conversion step of changing the real parts of points of the image formed in the inverse transform step so that the minimum of the real parts is not smaller than 0.

20. A medium according to claim 17, wherein, in at least one of the transform step and the inverse transform step, Fourier transform or inverse Fourier transform is performed by using a fast Fourier transform algorithm.

21. An information recording medium having an image processing program stored therein, said image processing program being readable and executable by a computer which performs a process including an image input step of inputting an entire original image at a time, a transform step of performing Fourier transform of the input image, an amplitude replacement step of replacing an amplitude distribution of points on a Fourier complex plane obtained by the Fourier transform with a predetermined function, a smoothing transform step of performing equivalent smoothing transform of a phase distribution of the points on the Fourier complex plane obtained by the Fourier transform in one of a direction along the abscissa and a direction along the coordinate ordinate a difference or differential detection step of extracting differences or differentials in the phase distribution processed by the equivalent smoothing transform, the differences or differentials being extracted along the direction of the smoothing transform, a secondary difference or differential detection step of further extracting differences or differentials in a phase distribution obtained by extracting differences or differentials in the difference detection step, a combining step of combining an amplitude distribution obtained by the replacement with the predetermined function, and the secondary differences or differentials in the phase distribution, and replacing the amplitude distribution with the result of the combining, and an inverse transform step of forming an image corresponding to the original image by inverse Fourier transform from the phase distribution of the points on the Fourier complex plane obtained by the Fourier transform and from the amplitude distribution obtained by the combining.

22. A medium according to claim 21, wherein the predetermined function comprises a 1/f function using as a parameter a spatial frequency f of the input image corresponding to the distance from a center point of the Fourier complex plane.

23. A medium according to claim 21, wherein the smoothing transform step includes a step of adding $2n\pi$ (n: integer) to each of the points starting from a phase value on one of the coordinate and the abscissa of the Fourier complex plane such that the amount of change between the phase values of each pair of the points adjacent to each other in one of a direction along the coordinate and a direction along the abscissa is within the range of $\pm\pi$.

24. A medium according to claim 21, wherein, in at least one of the transform step and the inverse transform step, Fourier transform or inverse Fourier transform is performed by using a fast Fourier transform algorithm.

* * * * *